US011232685B1

(12) United States Patent
Nixon

(10) Patent No.: US 11,232,685 B1
(45) Date of Patent: Jan. 25, 2022

(54) SECURITY SYSTEM WITH DUAL-MODE EVENT VIDEO AND STILL IMAGE RECORDING

(71) Applicant: AMAZON TECHNOLOGIES, INC., Seattle, WA (US)

(72) Inventor: Quinton Nixon, Sherman Oaks, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/209,827

(22) Filed: Dec. 4, 2018

(51) Int. Cl.
  G08B 13/196  (2006.01)
  H04N 7/18   (2006.01)
  H04N 5/232  (2006.01)
  G06K 9/62   (2006.01)

(52) U.S. Cl.
  CPC ...... *G08B 13/19604* (2013.01); *G06K 9/6211* (2013.01); *H04N 5/23245* (2013.01); *H04N 7/186* (2013.01)

(58) Field of Classification Search
  None
  See application file for complete search history.

(56) References Cited

U.S. PATENT DOCUMENTS

| 4,764,953 | A  | 8/1988  | Chern et al. |
| 5,355,517 | A  | 10/1994 | Olson |
| 5,428,388 | A  | 6/1995  | Von Bauer et al. |
| 5,760,848 | A  | 6/1998  | Cho |
| 6,072,402 | A  | 6/2000  | Kniffin et al. |
| 6,192,257 | B1 | 2/2001  | Ray |
| 6,271,752 | B1 | 8/2001  | Vaios |
| 6,429,893 | B1 | 8/2002  | Xin |
| 6,456,322 | B1 | 9/2002  | Marinacci |
| 6,476,858 | B1 | 11/2002 | Ramirez Diaz et al. |
| 6,633,231 | B1 | 10/2003 | Okamoto et al. |

(Continued)

FOREIGN PATENT DOCUMENTS

| CN | 2585521 Y | 11/2003 |
| CN | 2792061 Y | 6/2006 |

(Continued)

OTHER PUBLICATIONS

U.S. Appl. No. 16/780,457, Office Action dated Mar. 24, 2021, 11 pages.

(Continued)

*Primary Examiner* — Stefan Gadomski
(74) *Attorney, Agent, or Firm* — Lathrop GPM LLP

(57) ABSTRACT

A security system includes a server and at least one dual-mode image capture device. The capture device includes a camera that captures images of a field of view of a monitored area. When motion is detected in the monitored area, the capture device sends the images as video to a server, and when the motion is not detected in the monitored area, the capture device sends, at intervals, at least one still image to the server. Irrespective of whether the capture device has a cloud storage subscription, the server may store the still image(s) in a database for later retrieval as evidence of an event at or near the monitored area. In certain embodiments, when the still image(s) do not significantly differ from a reference image of the monitored area, the still image(s) may be discarded and not stored in the database.

22 Claims, 17 Drawing Sheets

(56) References Cited

U.S. PATENT DOCUMENTS

| | | |
|---|---|---|
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,264,510 B2 | 4/2019 | Jeong et al. |
| 2002/0094111 A1 | 7/2002 | Puchek et al. |
| 2002/0125435 A1* | 9/2002 | Cofer .......... G08B 13/19686 250/341.1 |
| 2002/0135483 A1* | 9/2002 | Merheim ....... G08B 13/19604 340/573.1 |
| 2002/0147982 A1 | 10/2002 | Naidoo et al. |
| 2003/0035577 A1* | 2/2003 | Tran ................... G06T 7/254 382/152 |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0114054 A1* | 6/2004 | Mansfield ........ G08B 13/19652 348/700 |
| 2004/0135686 A1 | 7/2004 | Parker |
| 2004/0161133 A1* | 8/2004 | Elazar ............... G06K 9/00771 382/115 |
| 2004/0212678 A1* | 10/2004 | Cooper ........... G08B 13/19695 348/155 |
| 2005/0007451 A1* | 1/2005 | Chiang ........... G08B 13/19634 348/143 |
| 2005/0074140 A1* | 4/2005 | Grasso ............. G08B 13/1968 382/103 |
| 2005/0111660 A1 | 5/2005 | Hosoda |
| 2005/0170774 A1 | 8/2005 | Shiohara et al. |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0189728 A1* | 8/2007 | Yu .................... H04N 5/232 386/226 |
| 2008/0292189 A1* | 11/2008 | Morimoto ........... G06K 9/6211 382/181 |
| 2009/0033745 A1* | 2/2009 | Yeredor ........... G08B 13/19682 348/152 |
| 2011/0058035 A1* | 3/2011 | DeBerry ............. H04N 7/188 348/143 |
| 2012/0079507 A1* | 3/2012 | Agarwal ............ H04L 12/2821 719/321 |
| 2013/0057695 A1 | 3/2013 | Huisking |
| 2013/0077108 A1* | 3/2013 | Yumiki ........... H04N 1/00453 358/1.9 |
| 2013/0188542 A1 | 7/2013 | Merlin et al. |
| 2014/0098286 A1* | 4/2014 | Kannermark ...... H04N 5/23241 348/372 |
| 2014/0247941 A1 | 9/2014 | Gu et al. |
| 2015/0035987 A1 | 2/2015 | Fernandez |
| 2015/0312531 A1* | 10/2015 | Samad ................ H04N 7/186 348/143 |
| 2015/0381949 A1* | 12/2015 | Renkis ............... H04N 7/183 348/143 |
| 2016/0063105 A1* | 3/2016 | Renkis ................ H04W 4/38 348/159 |
| 2016/0094815 A1* | 3/2016 | Scalisi .............. G06K 9/00288 348/156 |
| 2016/0203370 A1* | 7/2016 | Child ................ G06K 9/00288 348/143 |
| 2016/0284170 A1* | 9/2016 | Kasmir ................ G08B 7/06 |
| 2016/0330403 A1* | 11/2016 | Siminoff ............ H04N 5/2252 |
| 2016/0330413 A1* | 11/2016 | Scalisi .................. H04N 7/186 |
| 2016/0334811 A1* | 11/2016 | Marten ................. G05B 15/02 |
| 2017/0024987 A1* | 1/2017 | Lin ..................... H04N 7/183 |
| 2017/0084132 A1* | 3/2017 | Scalisi ............. G08B 13/1966 |
| 2017/0085843 A1* | 3/2017 | Scalisi ................. H04N 7/188 |
| 2017/0085844 A1* | 3/2017 | Scalisi ................. G06Q 50/163 |
| 2017/0109984 A1* | 4/2017 | Child ................ H04M 1/0291 |
| 2017/0162225 A1* | 6/2017 | Jeong ............. G08B 13/19695 |
| 2017/0163944 A1* | 6/2017 | Jeong ................. G01J 5/0025 |
| 2017/0171516 A1* | 6/2017 | Modestine ........ H04W 52/0209 |
| 2017/0187995 A1* | 6/2017 | Scalisi ............. G08B 13/19684 |
| 2017/0195639 A1* | 7/2017 | Gluckman .......... H04N 21/2407 |
| 2017/0220872 A1* | 8/2017 | Child ................ G08B 13/196 |
| 2017/0249776 A1* | 8/2017 | Cao ..................... G06T 7/75 |
| 2017/0251035 A1* | 8/2017 | Siminoff .......... G08B 13/19656 |
| 2017/0272269 A1* | 9/2017 | Siminoff ............ H04M 11/025 |
| 2017/0280112 A1* | 9/2017 | Siminoff ............. H04N 5/91 |
| 2017/0289450 A1* | 10/2017 | Lemberger ............ G06T 7/70 |
| 2017/0322942 A1* | 11/2017 | Duda .................. H04N 21/2393 |
| 2017/0330302 A1* | 11/2017 | Rintala ............... H04N 5/23222 |
| 2017/0358186 A1* | 12/2017 | Harpole ............ G08B 13/19682 |
| 2018/0041830 A1 | 2/2018 | Shahamat et al. |
| 2018/0053408 A1* | 2/2018 | Siminoff ........... G08B 13/19619 |
| 2018/0068506 A1* | 3/2018 | Lee ..................... G07C 9/00571 |
| 2018/0082413 A1* | 3/2018 | Saito ................... G06T 7/001 |
| 2018/0091569 A1* | 3/2018 | Roth ................ G08B 13/19667 |
| 2018/0129885 A1* | 5/2018 | Potter ................ G06K 9/00288 |
| 2018/0139332 A1* | 5/2018 | Kerzner .............. H04M 11/045 |
| 2018/0191930 A1* | 7/2018 | Jeong ................... H05K 1/144 |
| 2018/0211440 A1* | 7/2018 | Kunkel ............... G06T 15/04 |
| 2018/0218201 A1* | 8/2018 | Siminoff ........... G08B 13/19682 |

(56) References Cited

U.S. PATENT DOCUMENTS

| | | | |
|---|---|---|---|
| 2018/0220108 A1* | 8/2018 | Siminoff | H04N 7/186 |
| 2018/0234531 A1* | 8/2018 | Ekkel | G08B 3/10 |
| 2018/0307903 A1* | 10/2018 | Siminoff | G06K 9/00771 |
| 2018/0342329 A1* | 11/2018 | Rufo | H04L 12/2812 |
| 2018/0343141 A1* | 11/2018 | Scalisi | H04L 12/2818 |
| 2018/0343142 A1* | 11/2018 | Scalisi | H04N 7/186 |
| 2019/0014291 A1* | 1/2019 | Siminoff | H04M 11/02 |
| 2019/0020827 A1* | 1/2019 | Siminoff | G08B 13/19669 |
| 2019/0028759 A1* | 1/2019 | Yuan | H04N 21/43615 |
| 2019/0089934 A1* | 3/2019 | Goulden | G08B 13/19684 |
| 2019/0149775 A1* | 5/2019 | Alamgir | G08B 13/1966 |
| | | | 348/143 |
| 2019/0188980 A1* | 6/2019 | Viswanathan | G08B 13/19602 |
| 2019/0298241 A1* | 10/2019 | Yamaoka | G06K 9/00288 |
| 2019/0304274 A1* | 10/2019 | Britton | G08B 13/19656 |
| 2019/0339369 A1* | 11/2019 | Fenton | G06T 7/85 |
| 2019/0394361 A1* | 12/2019 | Ishida | H04N 21/4312 |
| 2020/0169669 A1* | 5/2020 | Petkov | G06F 1/3265 |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

OTHER PUBLICATIONS

U.S. Appl. No. 16/178,509, Notice of Allowance dated Apr. 1, 2020, 10 pages.

* cited by examiner

SECURITY SYSTEM WITH DUAL-MODE EVENT VIDEO AND STILL IMAGE RECORDING

TECHNICAL FIELD

The present embodiments relate to security systems that include sensors, automation devices, and/or audio/video (A/V) recording and communication devices. In particular, the present embodiments relate to improvements in the functionality of security systems that strengthen the ability of such systems to reduce crime and enhance public safety.

BACKGROUND

Home safety is a concern for many homeowners and renters. Those seeking to protect or monitor their homes often wish to be informed of breaches to the security of their homes and also have video and audio communications with visitors/trespassers, for example, those visiting/trespassing near an external door or entryway. Security systems that include sensors, automation devices, and/or A/V recording and communication devices, such as doorbells, provide this functionality, and can also aid in crime detection and prevention. For example, sensor information, audio, and/or video captured by a security system, such as by an A/V recording and communication doorbell of a security system, can be uploaded to the cloud and recorded on a remote server. Subsequent review of the sensor information and/or the A/V footage can aid law enforcement in capturing perpetrators of home burglaries and other crimes. Further, the presence of a security system including one or more an A/V recording and communication devices on the exterior of a home, such as a doorbell unit at the entrance of a home, acts as a powerful deterrent against would-be burglars.

BRIEF DESCRIPTION OF THE DRAWINGS

The various embodiments of the present security system with dual-mode event video and still image recording now will be discussed in detail with an emphasis on highlighting the advantageous features. These embodiments depict the novel and non-obvious security system with dual-mode event video and still image recording shown in the accompanying drawings, which are for illustrative purposes only. These drawings include the following figures, in which like numerals indicate like parts.

DETAILED DESCRIPTION

A security device, such as a video doorbell, a floodlight camera, and the like, may include motion detection, and may operate to capture video of a monitored area when motion is detected. The video may be transmitted to and stored at a server (e.g., a cloud server). However, many users of security devices do not subscribe to cloud storage for video generated by their security devices; and although this video may be viewed in real-time (e.g., as streaming video sent to the user's smartphone), the video is not saved and cannot be subsequently retrieved if the user does not have a cloud storage subscription.

Further, where an event of interest does not trigger motion detection, for example because the event is outside a motion detection area defined for the security device, the security device might not capture video of the event. In particular, many users have video doorbells that face a street or a walkway. To reduce unwanted or excessive motion notifications, these users may configure their video doorbells with a motion detection area that excludes the street or the walkway. Accordingly, when an event (e.g., an accident or a crime) occurs in the street or on the walkaway, motion in these excluded areas may not trigger the video doorbell to capture video, even though the street or the walkway is within the field of view (FOV) of the camera. Accordingly, video doorbells that are configured to exclude portions of the FOV of the camera from the motion detection area of the video doorbell may not capture video of some events, thereby potentially missing opportunities to capture evidence of accidents or crimes that occur in the excluded portions.

Figure 1A:
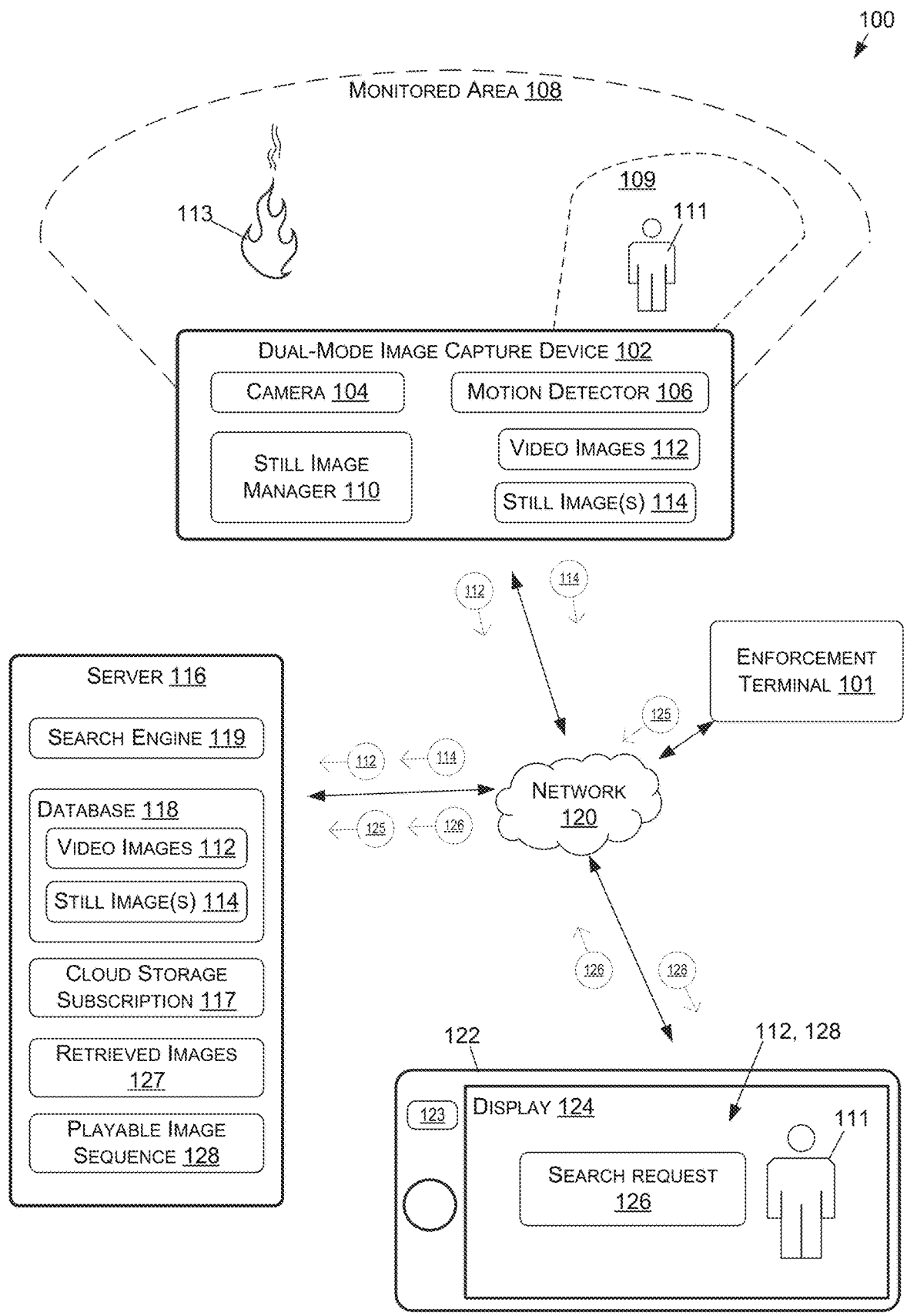
FIG. 1A is a schematic diagram of one example embodiment of a security system with dual-mode event video and still image recording, according to various aspects of the present disclosure.
Figure 1B:
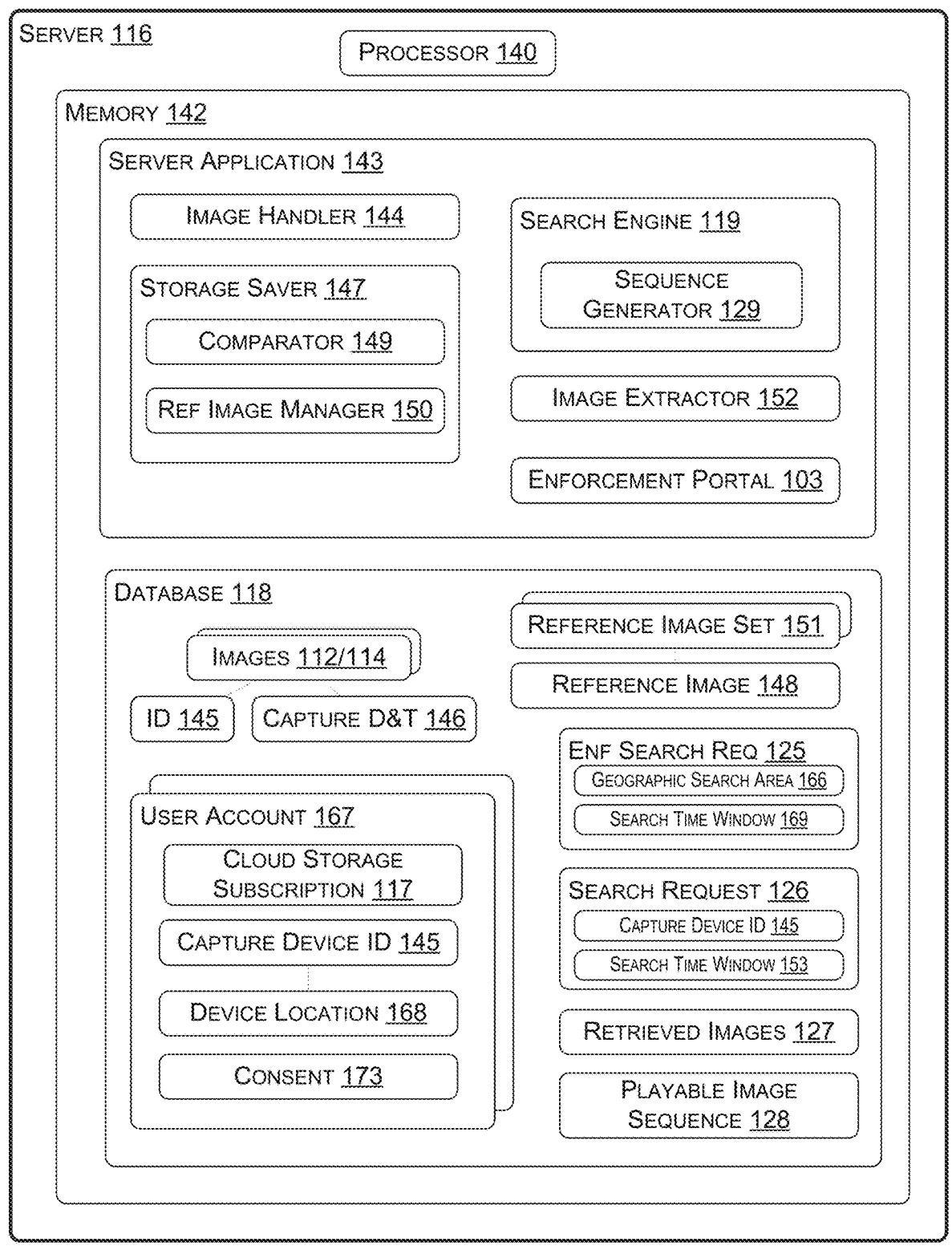
FIG. 1B is a functional block diagram illustrating one example embodiment of a server according to various aspects of the present disclosure.

The present embodiments describe enhancements to security devices and supporting servers that increase their usefulness to both the user and third-party enforcement agencies, such as the police. By configuring the security system with dual-mode event video and still image recording, at least one still image is captured, at intervals, and stored by a remote server and/or another device, such as a local hub device. One example security system 100 with dual-mode event video and still image recording is shown in FIG. 1A. One example security device with dual-mode event video and still image recording is shown in more detail in FIG. 1C as dual-mode image capture device 102. One example server for the security system 100 is shown in FIG. 1B. With user consent, the dual-mode image capture device of one embodiment includes software that captures at least one still image at intervals. In one example, software of the dual-mode image capture device controls a camera of the device to capture between two and six images at intervals of between two and ten seconds. These still images are sent to the server where they are stored in a database, tagged with at least an identification of the dual-mode image capture device (e.g., to derive location), and a date and/or time of capture.

Provided there is user consent, these images are stored by the backend server in a database, even when the user does not subscribe to cloud storage. The server may include a search engine that allows the user to retrieve one or more of the still images captured by the dual-mode image capture device (e.g., based at least in part upon the corresponding identification) from the database that were captured within a specified search window (e.g., a date and/or time range). In certain embodiments, the retrieved still images are processed into a time-lapse video sequence that may be played by the user on a client device (e.g., a smartphone, tablet, laptop computer, etc.). Thus, even without a cloud storage subscription, and without the dual-mode image capture device being triggered (e.g., as a result of detecting motion, receiving a button push, receiving a user "live view" request, etc.), the user may retrieve the still images corresponding to the search window. Such images may contain useful information, such as evidence, of an event that happened near the dual-mode image capture device. Using the example of an accident in a nearby street, the user may retrieve still images corresponding to the time of the accident.

With consent of the user, the server may also allow an enforcement agency (e.g., an authorized agency such as the police) to search the images for evidence of a crime or other event that may have been captured by the dual-mode image capture device. Although security devices such as video doorbells are becoming more common, without the enhancements of the embodiments described herein these security devices may not preserve video evidence of an event, such as a crime or suspicious activity, unless the event occurs within the motion detect area of the security device, and then only when the security device is associated with a cloud storage subscription. With the enhancements of the embodiments described herein, each dual-mode image capture device authorized by its corresponding user may capture still images at intervals, and those still images may be stored in a database regardless of whether motion was detected, and even when the security device is not associated with a cloud storage subscription. These stored images may be saved for a predetermined time (e.g., one week, one month, six months, one year, etc.). Further, these images may be securely stored such that they may only be retrieved by an authorized person, such as the user of the corresponding dual-mode image capture device or an authorized person from the enforcement agency (and then only with permission from the user).

Advantageously, the enforcement agency may interact, using an enforcement portal, with the server retrieving image evidence captured within a specified geographic search area and captured during a specified search window. The geographic search area may define an area (e.g., a neighborhood) where a crime has occurred, and the search window may define a time period that includes a time (or estimated time) when the crime occurred. Accordingly, the server may provide a plurality of still images corresponding to the search window from one or more dual-mode image capture devices located in the neighborhood, for further evaluation.

Because the present embodiments capture still images, rather than video, a significant savings is achieved in the amount of storage needed for the still images as compared to the storage required for the video from typical security cameras. Since the still images are captured at intervals, the storage amount saved may be proportional to the selected interval. In some embodiments, the number of images and interval period may be selectable, thus further providing for control of storage at the server.

One or both of the server and the dual-mode image capture device may implement a learning algorithm that determines, for a particular dual-mode image capture device, a reference image of expected content for the corresponding monitored area. For example, where the monitored area includes a sidewalk, at certain times of the day (e.g., between midnight and six AM), there may be little activity on the sidewalk, and thus the still images captured by the dual-mode image capture device may have few or no events of interest. In this case, the dual-mode image capture device and/or the server may determine a reference image of the monitored area during such a period and then compare each newly captured still image to the reference image to determine whether the new still image contains an event of interest. When the new still image is significantly different from the reference image (e.g., different by at least a threshold amount or degree), the new still image is stored in the database; otherwise, the new still image is discarded. Thus, images with nothing of interest are not stored, thereby further reducing storage requirements. Where the dual-mode image capture device captures many still images that do not contain events of interest, the storage space used by the dual-mode image capture device may be reduced considerably. When searching for still images for a geographic search area and a search time window, since images with no events of interest are not stored, the number of still images returned by the server for further evaluation are also reduced, since in this situation there are no events captured by the dual-mode image capture device, nor still images stored at the server.

In various embodiments, the server may receive and store still images from a plurality of dual-mode image capture devices distributed over a large geographic area. Since each of the plurality of dual-mode image capture devices provides the server with still images of a corresponding monitored area, the server may allow an authorized party (e.g., an authorized person from a law enforcement agency), with permission from the user(s)/owner(s) of the dual-mode image capture devices, to retrieve certain of the still images based upon a defined geographic location and a search time window. For example, where a crime has occurred within a residential neighborhood, which is an area not typically covered by closed circuit television cameras (CCTV) or other types of continuous video capture security systems, the authorized party may retrieve still images from the database that were captured by dual-mode image capture devices located within the neighborhood at a time within a search time window that includes the (actual or estimated) time of the crime. Such still images may provide evidence useful to solving the crime, even where the crime itself is not captured by any of the dual-mode image capture devices. For example, one or more of the still images may show movement of a suspect through the neighborhood before and/or after the crime was committed and thereby provide valuable evidence that may lead to resolution of the crime. Without capture of still images by the dual-mode image capture devices of the present embodiments, evidence existing before, during, or after the crime may not be available.

The remaining detailed description describes the present embodiments with reference to the drawings. In the drawings, reference numbers label elements of the present embodiments. These reference numbers are reproduced below in connection with the discussion of the corresponding drawing features.

One aspect of the present embodiments includes the realization that many currently deployed security devices, such as video doorbells, do not have cloud storage subscriptions, and therefore captured video may be lost, since it is not stored for later retrieval. The present embodiments solve this problem by configuring the security devices with dual-mode event video and still image recording. When not triggered to record event video, the dual-mode image capture device captures at least one still image, at intervals, and sends the still image(s) to the server for storage. Advantageously, this process of still image recording enables retrieval of the still images from the server even when the security device is not associated with a cloud storage subscription.

Another aspect of the present embodiments includes the realization that, even when a security device has a cloud storage subscription, the security device may only capture video when triggered, such as by detecting motion, receiving a button push, receiving a user request, etc. A further realization of this aspect is that many security devices have configurable motion detection, including the capability of ignoring motion in one or more areas that are within the FOV of the device. Many currently deployed security devices, therefore, do not record video of events that happen within the FOV of the camera, because those events occur in areas that are excluded from triggering video recording by the device's motion detection settings. A yet further realization of this aspect is that motion detection and/or other triggering mechanisms of the security device may sometimes fail, resulting in the security device not being triggered when motion occurs, and therefore not capturing video images. The present embodiments solve these problems by configuring the security device with dual-mode event video and still image recording. When not triggered to capture event video, the dual-mode image capture device captures at least one still image at intervals, and sends the still image(s) to a remote server (and/or to another device, such as a local hub device) for storage. Advantageously, this process of dual-mode event video and still image recording captures still images even when no motion is detected, either because the motion occurred in an excluded area, or because motion detection has failed. This functionality of the present embodiments enables a user of the dual-mode image capture device to retrieve the still images from the server for events that were not captured on video.

Another aspect of the present embodiments includes the realization that many of the still images captured by the security device do not contain events of interest, and therefore may unnecessarily take up valuable storage space. The present embodiments solve this problem by configuring the security system with dual-mode event video and still image recording to only store images that significantly differ from a reference image of expected content for the monitored area. Advantageously, by storing only still images that significantly differ from the reference image, a significant amount of storage space is saved without losing images that may have content of interest.

Figure 1C:
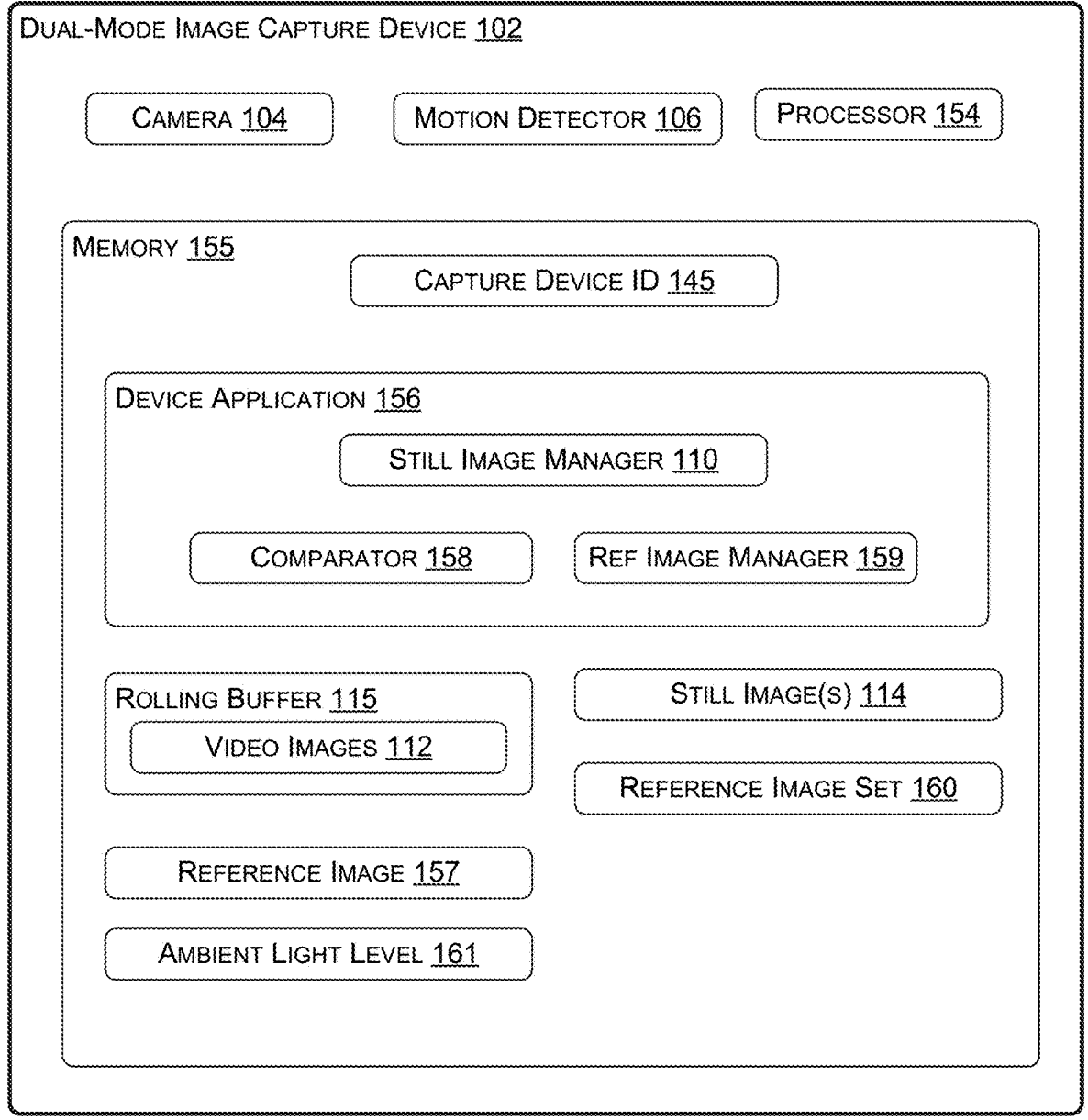
FIG. 1C is a functional block diagram illustrating one example embodiment of a dual-mode image capture device according to various aspects of the present disclosure.

One example security system 100 with dual-mode event video and still image recording is shown in FIG. 1A. One example server for the security system 100 is shown in FIG. 1B. One example security device with dual-mode event video and still image recording is shown in more detail in FIG. 1C as dual-mode image capture device 102. FIGS. 1A, 1B, and 1C are best viewed together in the following description.

With reference to FIG. 1A, the security system 100 includes a dual-mode image capture device 102 (hereinafter referred to as capture device 102) with a camera 104, a motion detector 106, and a still image manager 110. The capture device 102, which is shown in more detail in FIG. 1C, may be, for example, one of a video doorbell, a spotlight camera, and a security camera, and may include similar components and/or functionality to the audio/video (A/V) recording and communication devices 210 shown in FIG. 2 and described below. The capture device 102 may be positioned at a monitored area 108 such that the camera 104 captures images of the monitored area 108 and the motion detector 106 detects motion within the monitored area 108. The images captured by the camera 104 may include, in some embodiments, features and objects outside of the monitored area 108. For example, the field of view of the camera 104 may extend beyond the boundary of the monitored area 108 such that the camera 104 is capable of recording images of objects located outside the monitored area 108, even though motion outside of the monitored area 108 may not trigger the camera 104 to record.

The security system 100 also includes a server 116 with a database 118. The server 116, which is shown in more detail in FIG. 1B, may represent and/or include one or more of a computer server, cloud services, and cloud storage, and may include similar components and/or functionality to the network devices 220, 222, 224, 226 shown in FIG. 2 and described below. The capture device 102 and the server 116 may communicate via a network 120, which may include similar components and/or functionality as the network 212 also shown in FIG. 2 and described below.

In certain embodiments, the motion detector 106 may process images captured by the camera 104 to detect motion in the monitored area 108. In certain other embodiments, the motion detector 106 includes one or more pyroelectric infrared (PIR) sensors that detect changes in infrared radiation from the monitored area 108. In response to detected motion, the capture device 102 may capture video images 112 of the monitored area 108 and send the video images 112 to the server 116 via the network 120. When the capture device 102 detects motion, or is otherwise triggered, the video images 112 may be transmitted to a client device 122 (e.g., a smartphone, a tablet computer, a laptop computer, etc.), via the server 116, for display on a display 124 of the client device 122. For example, the video images 112 may be transmitted to the client device 122, via the network 120, and via the server 116, using a video streaming protocol, such as Dynamic Adaptive Streaming over HTTP (DASH, also known as MPEG-DASH), or HTTP Live Streaming (HLS). In certain embodiments described below, the client device 122 may be used to converse with a person 111 in the monitored area 108 via the capture device 102.

When the capture device 102 has a cloud storage subscription 117, the server 116 may store the video images 112 within the database 118, tagged with at least an identity of the capture device 102 (e.g., a unique identifying number, such as a MAC address, or a unique number of an associated account) and a date and time of capture of the video images 112. The cloud storage subscription 117 and storing of the video images 112 in the database 118 is a service provided by the server 116 that may be selected for the capture device 102, by the user or an authorized party, for example. When the capture device 102 does not have the cloud storage subscription 117, the video images 112 may be sent to the client device 122 by the server 116 in real-time (e.g., as they are captured by the capture device 102); however, the video images 112 are not stored in the database 118, and the video images 112 cannot therefore be retrieved for viewing, or processing, at a later time. The cloud storage subscription 117, in some instances, must be purchased. Therefore, some capture devices 102 may not have the cloud storage subscription 117.

As described above, the capture device 102 captures the video images 112 of the monitored area 108 when triggered, and unless the capture device 102 is triggered (e.g., by detecting motion, receiving a button push, receiving a user "live view" request, etc.), the video images 112 are not captured. Where motion detected by the motion detector 106 results in a notification on the client device 122, the motion detector 106 may be purposefully configured to detect motion only within a motion detection region 109 of the monitored area 108, where the motion detection region 109 is a sub-region of the monitored area 108, to avoid unwanted notifications. For example, where the monitored area 108 includes a path or roadway that has frequent activity, the motion detection region 109 may be configured to exclude the path or roadway to avoid the unwanted notifications. Accordingly, an event 113 (e.g., a fire) occurring within the monitored area 108, but outside motion detection region 109, may not be automatically captured within the video images 112.

To overcome this problem, the capture device 102 may advantageously include a still image manager 110 that, with consent of the user, controls the camera 104 to capture at least one still image(s) 114, at intervals, and to send the at least one still image(s) 114 to the server 116 via the network 120. For example, during installation of the capture device 102, the user may approve of capture of the still image(s) 114 by the capture device 102. In certain embodiments, the at least one still image(s) 114 may be a single image or a burst of images captured in rapid succession. For example, the burst of images may include two images, or three images, or four images, or five images, or six images, or ten images, or fifteen images, or any other number of images.

The present embodiments describe capturing still images at intervals when no triggering event occurs (e.g., motion detection), and recording video images in response to a triggering event. Still images may be distinguished from video images at least insofar as the manner in which the two types of images are recorded. For example, video images may be recorded at a frame rate of 12 frames per second (fps) or higher (e.g., 24 fps, or 30 fps, or 60 fps, or 120 fps, etc.), whereas still images may be recorded at a significantly lower rate, such as 6 fps or lower (e.g., 3 fps, or 2 fps, or 1 fps, or 0.5 fps, or 0.33 fps, or 0.2 fps, etc.).

Still images may additionally, or alternatively, be distinguished from video images by the intervals that characterize still images (the length of time between recording each single image, or each burst of images). Still images recorded according to the present embodiments are separated by intervals, which may be any length, and may be regular or irregular. For example, the intervals may be one second, or two seconds, or three seconds, or four seconds, or five seconds, or ten seconds, or fifteen seconds, or any other length of time, including fractions of seconds. Thus, in one example, still images may be recorded in bursts of three images at 1 fps, with each burst separated by an interval of three seconds. Video images, by contrast, are recorded continuously at a higher frame rate and for a sustained period, such as 10 seconds, or 20 seconds, or 30 seconds, or 40 seconds, etc. Advantageously, capturing a burst of still images at a reduced frame rate allows the burst of still images to cover a greater period with a reduced bandwidth and storage requirements as compared to the video images 112 that are captures continuously at higher frame rates.

Also, as used herein, the terms "capture" (and related forms, e.g., captured, capturing, etc.) and "record" (and related forms, e.g., recorded, recording, etc.) are used interchangeably, and should not be interpreted to have different meanings. For example, still images may be captured or recorded by the capture device 102, and video images may be captured or recorded by the capture device 102.

Still images may additionally, or alternatively, be distinguished from video images by the manner in which each is encoded and/or by the format of the data file used to store each type of image. For example, still images may be encoded using a first CODEC that results in a still image data file having a first format such as JPEG (Joint Photographic Experts Group), JFIF (JPEG File Interchange Format), Exif (Exchangeable image file format), TIFF (Tagged Image File Format), GIF (Graphics Interchange Format), PNG (Portable Network Graphics), etc., and video images may be encoded using a second CODEC that results in a video image data file having a second format such as MPEG (Moving Picture Experts Group, and all its variants), AVI (Audio Video Interleave), etc.

In certain embodiments, the capture device 102 is continuously powered from a mains electricity supply, and the camera is able to be powered on continuously, always recording images, and the recorded footage may be continuously stored, in chronological order, in a rolling buffer 115 (e.g., a sliding window). In some embodiments, about 10-15 seconds of recorded footage is continuously stored in the rolling buffer 115. Also, the camera 104 may be used for motion detection, because the camera 104 may be powered on continuously. For example, the motion detector 106 may be implemented as part of the device application 156 and with one or more software algorithms that are executed by the processor 154 to detect motion by processing recently captured images. In these embodiments, when the capture device 102 is not triggered (e.g., when motion is not detected, when no button is pressed on the capture device 102, and when there is no "live view" request), the still image manager 110 retrieves the still image(s) 114 from the rolling buffer 115. For example, the still image manager 110 may retrieve, at internals, the most recently stored image from the rolling buffer 115 as the still image(s) 114. In another example, where the still image(s) 114 is a burst of images with a frame rate equal to the capture frame rate of the camera, the still image manager 110 may retrieve, at internals, a plurality of the most recently consecutively stored images from the rolling buffer 115. In another example, where the still image(s) 114 is a burst of images with a frame rate lower than the capture frame rate, the still image manager 110 may retrieve, at internals, selective ones of the most recently stored images from the rolling buffer that correspond to the desired frame rate for the still image(s) 114. For example, where the capture frame rate is 30 fps, the number of frames in the still image(s) 114 is three, and the desired frame rate of the still image(s) 114 is 3 fps, the still image manager 110 may retrieve the most recently stored image, the tenth previously stored image, and the twentieth previously stored images from the rolling buffer as the still image(s) 114.

Irrespective of whether the capture device 102 has the cloud storage subscription 117, the server 116 may store the still image(s) 114 in the database 118, tagged with at least an identity of the capture device 102 and a date and time of capture of the still image(s) 114, so long as this storage is consented to by the person authorizing use of the capture device 102 (e.g., the user and/or owner of the capture device 102 and the client device 122). Continuing with the example of FIG. 1A, since the still image(s) 114 are captured, at intervals, and are recorded within the database 118 by the server 116, certain of the still image(s) 114 recorded within the database 118 may include the event 113 and, if desired, may be retrieved from the database 118 at a later time to provide evidence of the event 113 (e.g., the fire).

In various embodiments, the motion detection region 109 may be configurable by the user. For example, the user may designate one or more areas of the monitored area 108 to comprise the motion detection region 109, where motion occurring in the motion detection region 109 will trigger the camera 104 to record video, and motion occurring in the monitored area 108, but outside the motion detection region 109, will not trigger the camera 104 to record video. Alternatively, or in addition, the user may designate one or more areas of the monitored area 108 to be excluded from the motion detection region 109, where motion occurring in any of the excluded areas will not trigger the camera 104 to record video, and motion occurring in the monitored area 108, but outside the excluded areas, will trigger the camera 104 to record video.

The user may configure the motion detection region 109 using the client device 122. For example, live video from the camera 104 may be transmitted to the client device 122 (e.g., as a video stream) and displayed on the display 124 of the client device 122, and the user may draw the motion detection region 109 and/or the excluded areas on the display 124. In another example, a diagram of the monitored area 108 may be displayed on the display 124 of the client device 122, and the user may indicate the motion detection region 109 and/or the excluded areas by activating or deactivating one or more zones displayed on the diagram of the monitored area 108, and/or by increasing or decreasing a sensitivity of the motion detector 106, where the range of the motion detector 106 may be displayed on the diagram of the monitored area 108.

FIG. 1B is a functional block diagram illustrating the server 116 of FIG. 1A in further example detail, according to various aspects of the present disclosure. The server 116 may include a search engine 119 that allows the user to retrieve the video images 112 and still image(s) 114 for viewing on the client device 122. For example, an application 123 running on the client device 122 may be controlled (e.g., by the user) to send a search request 126 to the search engine 119 via the network 120. The search request 126 may define a capture device ID 145 of the capture device 102 (and/or an identity of the user and/or an account associated with the capture device 102) and a search time window 153. In various embodiments, the user may identify in the search request 126 one or more of his or her capture devices 102 that should be searched. The search request 126 may identify the capture devices 102 by name (e.g., "Front Doorbell," "North Alley Security Cam," etc.), or the search request 126 may include all devices corresponding to the requesting user/owner. Either way, the application 123 and/or the server 116 may associate the device name(s) with their respective capture device IDs 145.

In response to the search request 126, the search engine 119 retrieves images (shown as retrieved images 127) from the still image(s) 114 captured by the capture device 102 within the search time window 153. The search engine 119 then invokes a sequence generator 129 to generate a playable image sequence 128 by ordering the retrieved images 127, and sends the playable image sequence 128 to the client device 122 via the network 120. Although shown within the search engine 119, the sequence generator 129 may be external to the search engine 119 and the server application 143. The playable image sequence 128 may be, for example, similar to a time-lapse video of the monitored area 108. In some embodiments, the search engine 119 may also retrieve images from the video images 112 when the user has the cloud storage subscription 117 and the capture device 102 was triggered to capture the video images 112 during the search time window 153.

The server 116, and/or the search engine 119, may include security controls that allow only authorized persons (e.g., the user of the capture device 102, an owner of the capture device 102, an authorized person from an enforcement agency such as a police force (with the consent of the user/owner), etc.) to retrieve the video images 112 and/or the still image(s) 114 as the retrieved images 127. Accordingly, the video images 112 and/or the still image(s) 114 are protected from misuse.

In one example of operation, the user of the capture device 102 is interested to learn of events that occurred at the monitored area 108 earlier that morning, for example after finding evidence of the fire 113 when arriving home. The user interacts with the application 123 running on the client device 122 to generate the search request 126 defining the search time window 153 as between 9:00 AM and 11:00 AM on the current date. In response to the search request 126, the search engine 119 retrieves a subset of the video images 112 (when the user has the cloud storage subscription 117) and of the still image(s) 114, where the images in the subset were captured during the search time window 153. The search engine 119 then generates the playable image sequence 128. In the example shown in FIG. 1A, there are no video images 112 of the event 113, since the event 113 did not trigger the motion detector 106. Accordingly, the playable image sequence 128 nonetheless includes still image(s) 114 captured by the capture device 102 between 9:00 AM and 11:00 AM, and may show the event 113 (e.g., the fire) as it occurred. Without the still image manager 110, the event 113 would not have been captured by the capture device 102. Thus, the still image manager 110 significantly improves the usefulness of the capture device 102.

The user may retrieve the playable image sequence 128 from the server 116 for the search time window 153 even when the user has no cloud storage subscription 117, and even when the event 113 was not detected by the motion detector 106. Advantageously, the security system 100 stores at least the still image(s) 114 showing the monitored area 108 over time, such that the user may retrieve and view, on the display 124 of the client device 122, images of the monitored area 108 that may contain events of interest to the user, even when the capture device 102 did not record video of the events.

The security system 100 also advantageously uses less bandwidth of the network 120 as compared to conventional security systems that capture continuous video images from a conventional security camera. The security system 100 also uses less storage (e.g., within the database 118) as compared to conventional security systems that store the continuous video images from the conventional security cameras.

With reference to FIG. 1B, the server 116 may include at least one processor 140 communicatively coupled with a memory 142 (e.g., RAM, ROM, flash, magnetic, optical, etc.) storing a server application 143 that has machine-readable instructions that are executable by the processor(s) 140 to implement the functionality of the server 116 in the embodiments described herein.

The search engine 119 may form part of the server application 143, which may also include an image handler 144 to receive the video images 112 and/or the still image(s) 114 from the capture device 102. When the capture device 102 has the cloud storage subscription 117, the image handler 144 may store the video images 112 in the database 118, and tag the video images 112 with at least a capture device ID 145 corresponding to the capture device 102 sending the video images 112, and a capture date and time 146. Irrespective of whether the capture device 102 has the cloud storage subscription 117, the image handler 144 may store the still image(s) 114 in the database 118, and tag the still image(s) 114 with at least a capture device ID 145 corresponding to the capture device 102 sending the still image(s) 114, and a capture date and time 146. The cloud storage subscription 117 may associate with, or be part of, a user account 167 stored within the database 118, and may correspond to more than one capture device 102, as identified by the capture device ID 145. As described in more detail below, in an embodiment the server 116 may further generate at least one reference image 148 for each of the capture devices 102.

When the capture device 102 is triggered (e.g., by detecting motion, receiving a button push, receiving a user "live view" request, etc.) to send the video images 112 to the server 116, the still image manager 110 may not simultaneously send the still image(s) 114. Thus, to avoid gaps in the still image(s) 114 stored in the database 118 when the capture device 102 does not have the cloud storage subscription 117, the server application 143 may include an image extractor 152 to extract still images, at intervals, from the video images 112, to store those still images in the database 118, and to tag the still images with at least a capture device ID 145 corresponding to the capture device 102 sending the video images 112, and a capture date and time 146. Accordingly, the still image(s) 114 stored in the database 118 have no gaps when the video images 112 are received.

Storage Saver

With continued reference to FIG. 1B, the server application 143 may also include a storage saver 147 to reduce the amount of storage needed within the database 118 for the still image(s) 114. The storage saver 147 may include a comparator 149 to compare each still image(s) 114 received from the capture device 102 with a reference image 148 corresponding to the capture device 102 and the monitored area 108. The reference image 148 defines expected content for an image captured by the camera 104 when there are no events of interest (e.g., no motion) occurring within the monitored area 108. For example, over a limited-duration period (e.g., between five and sixty seconds), a plurality of the still image(s) 114 may be received from the capture device 102. When there is little to no motion detected within the monitored area 108 during the limited-duration period, such as when the motion detector 106 of the capture device 102 does not detect motion within the motion detection region 109, one or more of the still image(s) 114 received during the limited-duration period may be used to update the reference image 148. In certain other embodiments, described in detail below, the one or more still image(s) 114 may be pre-processed, using one or more image processing algorithms, such as edge detection, object detection, and so on, and the reference image 148 may be updated with this processed image.

The comparator 149 compares each still image(s) 114 received from the capture device 102, and/or extracted from the video images 112, to the reference image 148 to determine whether it contains any significant differences (discussed below). When the comparator 149 determines that the still image(s) 114 is significantly different from the reference image 148, it is stored in the database 118 as described above. However, when the still image(s) 114 is not significantly different from the reference image 148, the comparator 149 determines that the still image(s) 114 contains nothing of significance (e.g., the content of the still image(s) 114 includes no event that would interest the user or another authorized person); in this case the still image(s) 114 may be discarded and is not stored in the database 118. For example, where no significant traffic (e.g., people, animals, or vehicles) pass through the field of view of the camera 104 for extended periods throughout each day, the storage saver 147 may considerably reduce storage needs for the capture device 102 and within the database 118.

The still image(s) 114 may be significantly different from the reference image 148 when the still image(s) 114 includes an object (e.g., a person, a parcel, a vehicle, etc.) that is not present in the reference image 148. Conversely, the still image(s) 114 may be significantly different from the reference image 148 when the still image(s) 114 does not include an object that is present in the reference image 148. Still further, the still image(s) 114 may be significantly different from the reference image 148 when an object is present in both the still image(s) 114 and the reference image 148, but the object is in different locations in the two image(s) 114, 148.

Generally, however, the determination of whether the still image(s) 114 is significantly different from the reference image 148 may include using one or more image processing algorithms and techniques that allow the comparator 149 to ignore differences between the still image(s) 114 and the reference image 148 that correspond to insignificant changes in the monitored area 108 that are not of interest to the user. In one example, the comparator 149 may use an object detection algorithm to detect objects within the still image(s) 114, and may further determine a count of detected objects therein, and for each of the detected objects, the comparator 149 may further determine characteristics including an object type and an object position within the still image(s) 114. The objects detected by the comparator 149 may be objects considered significant to the user, such as packages, boxes, animals, persons, vehicles, and so on. Accordingly, other features within the still image(s) 114 and not identified as an object may be ignored. The comparator 149 may then compare the detected objects and their characteristics with objects previously detected in the reference image 148. In one example, the comparator 149 may detect a bicycle at a first position within the still image(s) 114. The comparator 149 may then determine that the still image(s) 114 is significantly different from the reference image 148 when a count of the objects and/or characteristics (e.g., object types and positions in the image) of each object are inconsistent between the reference image 148 and the still image(s) 114.

For example, where one or more objects (e.g., a package) detected within the reference image 148 is not detected within the still image(s) 114, the comparator 149 may determine that the still image(s) 114 is significantly different from the reference image 148. Similarly, where one or more objects (e.g., a person) detected within the still image(s) 114 are not also detected within the reference image 148, the comparator 149 may determine that the still image(s) 114 is significantly different from the reference image 148. In another example, where one or more objects (e.g., a package) detected within the reference image 148 has a different position within the still image(s) 114, the comparator 149 may determine that the still image(s) 114 is significantly different from the reference image 148.

In other embodiments, the comparator 149 may use an image processing algorithm to generate a first perceptual hash value for the still image(s) 114. The comparator 149 may then compare that first perceptual hash value to the reference image 148, which may be a second perceptual hash value previously generated as the reference image. The difference between the first and second perceptual hash values indicates a variance between the two images that may be compared to a threshold value to determine when the still image(s) 114 is significantly different from the reference image 148. For example, the threshold value may define which differences are significant. Other techniques and/or image processing algorithms may be used to determine significant differences between the still image(s) 114 and the reference image 148 without departing from the scope of the embodiments described herein.

At different times of the day, lighting conditions at the monitored area 108 may change due to, for example, movement of the sun, operation of artificial lighting, etc. These changes may make it more difficult to identify significant differences between the still image(s) 114 and the reference image 148. For example, the comparator 149 may return a false positive (e.g., determining that the still image(s) 114 is significantly different from the reference image 148) when the still image(s) 114 and the reference image 148 are captured at different times of the day (e.g., daytime versus nighttime). To facilitate correctly analyzing the significance between the still image(s) 114 and the reference image 148 at different times of the day, the server 116 may include a reference image set 151 that includes two or more different reference images of the monitored area 108 that were captured at different times of the day. Accordingly, a reference image manager 150 within the storage saver 147 may select, from the reference image set 151, the reference image 148 to be compared with the still image(s) 114 based upon a current time (e.g., the time that the still image(s) 114 was captured) and a timestamp associated with each reference image 148 in the reference image set 151 (e.g., the time that each reference image 148 was captured). For example, the reference image manager 150 may select, from the reference image set 151, the reference image 148 having a timestamp that most closely matches the time that the still image(s) 114 was captured. Thus, in various embodiments, the still image(s) 114 may be timestamped at the time of capture to facilitate this comparison.

Weather effects (e.g., movement of trees or shrubs by wind, the effects of precipitation at the monitored area 108, accumulation of snow on objects and the ground, and so on) may also cause the comparator 149 to indicate that the still image(s) 114 is significantly different from the reference image 148, when in fact it is not. Accordingly, the server 116 may include images within the reference image set 151 corresponding to different weather conditions at the monitored area 108, and the reference image manager 150 may select the reference image 148 from the reference image set 151 based upon current weather conditions at the monitored area 108. For example, a reference image of a back yard captured during winter will look much different from a reference image of that back yard captured during the spring, summer and/or autumn. Accordingly, the reference image set 151 may contain reference images 148 corresponding to the seasons, wherein the comparator 149 selects the reference image 148 from the reference image set 151 based upon a date portion of the capture date and time of the still image(s) 114 so that the selected reference image 148 corresponds to the season in which the still image(s) 114 was captured.

In certain embodiments, the reference image manager 150 automatically selects the reference image 148 from a most recent set of the still image(s) 114 received from the capture device 102. For example, where a most recently received still image(s) 114 (or set of still image(s) 114, where the still image(s) 114 are received in bursts) from the capture device 102 does not significantly differ from a still image(s) 114 (or set of still image(s) 114) that was received just prior to the most recent still image(s) 114 (or set of still image(s) 114), the reference image manager 150 may select the most recent still image(s) 114 (or one of the still image(s) 114 from the most recent set of still image(s) 114) as the reference image 148. Alternatively, where a series of received still image(s) 114 (or sets of still image(s) 114) from the capture device 102 does not significantly change for a defined period (e.g., ten seconds, twenty seconds, thirty seconds, one minute, two minutes, five minutes, ten minutes, etc.), the reference image manager 150 may select the most recent still image(s) 114 (or one of the still image(s) 114 from the most recent set of still image(s) 114) as the reference image 148. In these embodiments, the reference image 148 is continuously updated automatically so that it reflects current conditions at the monitored area 108. These embodiments thus may advantageously reduce the incidence of false positives, because each newly received still image(s) 114 is compared with a reference image 148 that was captured close in time to when the newly received still image(s) 114 was captured.

For example, where the monitored area 108 is outside a front door of a residence, when a delivery person approaches the residence and leaves a package within a field of view of the camera 104, the comparator 149 may initially indicate that the still image(s) 114 including the package are significantly different from the reference image 148, which does not include the package, thereby causing the still image(s) 114 to be stored within the database 118. Soon thereafter, however, (e.g., with the next received still image(s) 114, or after the defined period elapses without further significant changes occurring within the monitored area 108), the reference image manager 150 may update the reference image 148, with a recently received still image(s) 114 that includes the package. Then, for subsequently received still image(s) 114 that include the package, the package will not cause the comparator 149 to indicate that the still image(s) 114 is significantly different from the reference image 148.

In various embodiments, at least some aspects of the server 116 may be embodied in the hub 202 of the system 200 (FIG. 2), and/or in at least one of the remote storage devices 222, the remote servers 224, and the application programming interfaces (APIs) 226. In particular, the hub 202 may include various components and modules that perform functions similar to the database 118, including the reference image 148 and the reference image set 151. The hub 202 may further include various components and modules that perform functions similar to the server application 143, including the image handler 144, the storage saver 147, the comparator 149, the reference image manager 150, the search engine 119, the sequence generator 129, and the image extractor 152.

FIG. 1C is a functional block diagram illustrating the capture device 102 of FIG. 1A in further example detail, according to various aspects of the present disclosure. The capture device 102 may include at least one processor 154 that communicatively couples to a memory 155 storing a device application 156. The device application 156 includes machine-readable instructions executable by the processor 154 to provide functionality of the capture device 102 described in the embodiments herein. For example, the still image manager 110, described above, may be implemented as at least part of the device application 156. The device application 156 may also determine motion, using the motion detector 106 and/or the camera 104, to trigger capture of the video images 112. The device application 156 may also trigger capture of the video images 112 when instructed by one of the server 116 and the client device 122. The device application 156 sends the captured video images 112 to the server 116 (and/or to a local device, such as a hub of the security system 100) via the network 120 (FIG. 1A). When not triggered, as described above, the still image manager 110 captures still image(s) 114, at intervals, and sends them to the server 116 (and/or to the local device) via the network 120.

The memory 155 may also store the capture device ID 145 that uniquely identifies the capture device 102. The capture device ID 145 may be sent with the video images 112 and/or the still image(s) 114 for use within the database 118 by the server 116.

In some embodiments, functionality of the comparator 149 of the server application 143 may be implemented at the capture device 102. In these embodiments, the capture device 102 may include a reference image 157, stored in the memory 155, and the device application 156 may include a comparator 158 with functionality similar to the comparator 149 of the server application 143. Specifically, the comparator 158 may compare each still image(s) 114 to the reference image 157, and when the comparator 158 determines that the still image(s) 114 is significantly different from the reference image 157 (using any of the methodologies described above, or another methodology), the still image manager 110 sends the still image(s) 114 to the server 116 (and/or to the local device), where it is stored in the database 118. When the comparator 158 determines that the still image(s) 114 is not significantly different from the reference image 157, the still image manager 110 does not send the still image(s) 114 to the server 116. Accordingly, only still image(s) 114 with content including events of interest are sent from the capture device 102 to the server 116 and stored in the database 118.

The functionality of the reference image manager 150 of the server application 143 may alternatively be implemented within the capture device 102. In particular, the device application 156 may include a reference image manager 159 that includes functionality similar to the reference image manager 150, and the memory 155 may store a reference image set 160 that is similar to the reference image set 151. In certain embodiments, using data from the camera 104 for example, the reference image manager 159 may determine an ambient light level 161 at the monitored area 108. The reference images within the reference image set 160 may correspond to different ambient light levels at the monitored area 108 (and not necessarily a time of day), and the reference image manager 159 may select the reference image 157 from the reference image set 160 based upon the ambient light level 161. In such embodiments, the images in the reference image set 160 may include metadata that indicates the ambient light level associated with each image in the reference image set 160 (e.g., the ambient light level that was detected at the time each image in the reference image set 160 was captured).

In certain embodiments, the reference image 157 may be received from the server 116 and stored in the memory 155 for use by the comparator 158. For example, the reference image manager 150 of the server application 143 may determine the reference image 148, such as described above, and then send the reference image 148 to the capture device 102 for use as the reference image 157.

In various embodiments, one or more functionalities of the storage saver 147, the comparator 149/158, the reference image 149/158, the reference image manager 150/159, and/or the reference image set 151/160 may be implemented at a local device, such as a hub of the security system 100. For example, the hub 202 of the system 200 described below with reference to FIG. 2 may include one or more of a storage saver, a comparator, a reference image, a reference image manager, and a reference image set, and these components of the hub 202 may perform similar functions as the storage saver 147, the comparator 149/158, the reference image 149/158, the reference image manager 150/159, and the reference image set 151/160, respectively.

Figure 1D:
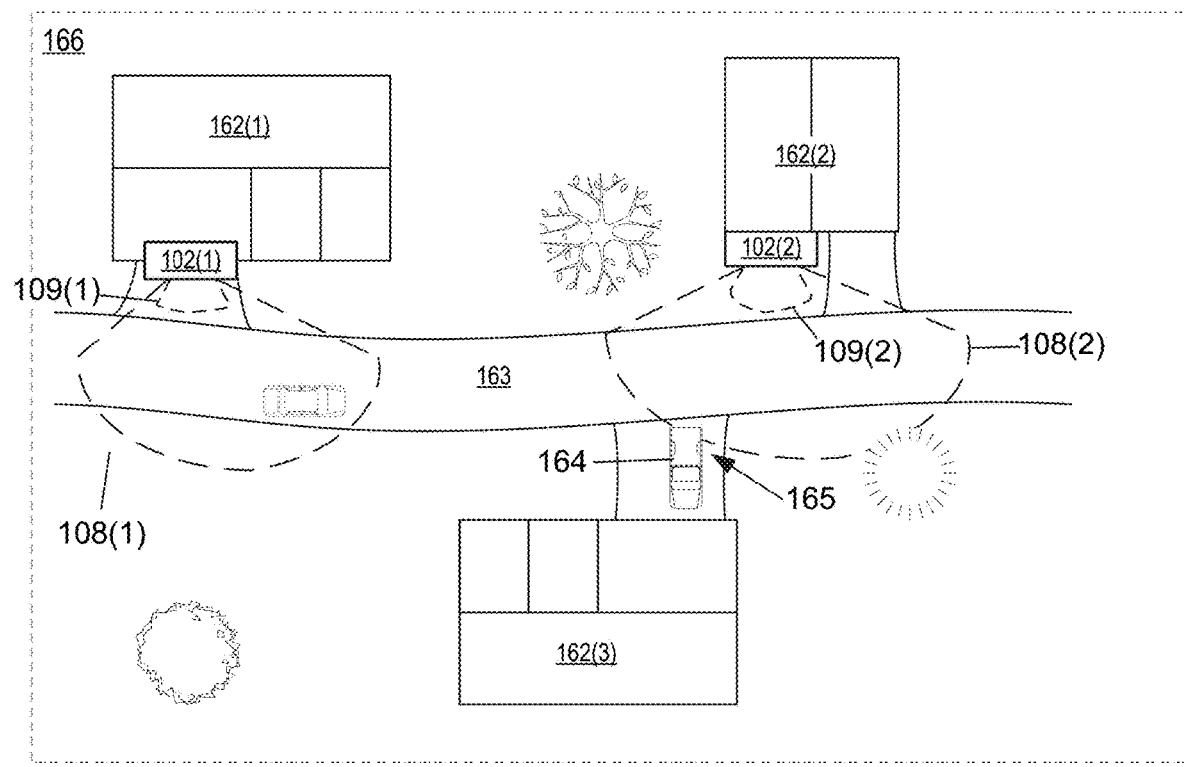
FIG. 1D is a schematic diagram showing one example plan view of a neighborhood according to various aspects of the present disclosure.

FIG. 1D shows one example plan view of a neighborhood, illustrating various aspects of the present disclosure. The neighborhood is shown with three residences 162(1), 162(2), 162(3), where the first residence 162(1) has a first capture device 102(1) (e.g., a video doorbell) located at a front door and facing a portion of a street 163 passing between the three residences 162. The first capture device 102(1) has a first monitored area 108(1) in front of the front door, and a first motion detection region 109(1) that does not extend into the street 163 (e.g., to avoid unwanted notifications). The second residence 162(2) has a second capture device 102(2) located at a front door and facing a different portion of the street 163. The second capture device 102(2) has a second monitored area 108(2) in front of the front door, and a second motion detection region 109(2) that also does not extend into the street 163.

In the scenario of FIG. 1D, an event 165 (e.g., a theft) occurs one afternoon and involves a pickup truck 164 parked in a driveway of the third residence 162(3), which is located on the opposite side of the street 163 from the first and second residences 162(1), 162(2). For example, an operator of the pickup truck 164 arrived at the third residence 162(3) at about 1:00 PM, working inside the third residence 162(3) until 3:45 PM when the event 165 was noticed (e.g., because the operator of the pickup truck 164 realized that an item that had been in the cargo bed of the pickup truck 164 was now missing). The operator then informs the police. In this scenario, neither the first capture device 102(1) nor the second capture device 102(2) detected motion and, therefore, neither device captured video images 112 at the time the event 165 occurred. However, as described above, both of the capture devices 102(1) and 102(2), even though not triggered, captured still image(s) 114 at intervals and sent the still image(s) 114 to the server 116, where the still image(s) 114 were stored in the database 118.

A member of the police department to which the operator reported the theft (an "enforcement person") may use an enforcement terminal 101 (FIG. 1A) to communicate with an enforcement portal 103 of the server 116. The enforcement terminal 101 may be, for example, a computer that connects to the enforcement portal 103 via the network 120 (e.g., the Internet). The enforcement portal 103 may implement a website or similar (e.g., client-server) interface that first authenticates the enforcement person using the enforcement terminal 101 (and/or the enforcement terminal 101 itself) to ensure that the database 118, the video images 112, and the still image(s) 114 are not accessed by unauthorized persons or entities. For example, the enforcement terminal 101 and/or the enforcement portal 103 may implement a login procedure and/or biometric authentication before allowing access to the video images 112 and/or the still image(s) 114 within the database 118.

Continuing with the scenario of FIG. 1D, the enforcement portal 103 receives an enforcement search request 125 (FIG. 1B) from the enforcement terminal 101 (as entered by the authorized enforcement person). The enforcement search request 125 defines a geographic search area 166 that includes a location where the event 165 occurred, and defines a search time window 169 that includes a time (or estimated time) when the event 165 occurred. For example, the enforcement portal 103 may allow the geographic search area 166 to be defined interactively on a map that shows the neighborhood where the event 165 occurred. In another example, the geographic search area 166 may be defined as a circle centered at the geographic location of the event 165 with a radius (e.g., one mile) that is defined interactively. In the scenario of FIG. 1D, the geographic search area 166 includes the three residences 162(1), 162(2), 162(3), and the location of the event 165, and the search time window 169 defines a period of 1:00 PM until 3:45 PM on the day of the event 165. The enforcement portal 103 sends the enforcement search request 125 to the search engine 119.

In one embodiment, the search engine 119 searches the database 118 to retrieve capture device IDs 145 of capture devices 102 having device locations 168 that are within the geographic search area 166. For example, capture devices 102 that store image data in the database 118 may have associated metadata stored in the database 118 (or in another location accessible to the search engine 119), where the metadata includes a location of each capture device 102. Based upon the retrieved capture device IDs 145, the search engine 119 may retrieve still image(s) 114, as retrieved images 127, from the database 118 that correspond to the capture device IDs 145 and that are tagged with a capture date and time 146 within the search time window 169 defined by the enforcement search request 125. In the example of FIG. 1D, the retrieved images 127 thus correspond to the still image(s) 114 captured by the first and second capture devices 102(1), 102(2) between 1:00 PM and 3:45 PM on the day of the event 165.

The application 123, running on the client device 122, may indicate the ability to search, even when the cloud storage subscription 117 has not been selected for the user account 167 by the user. The user may be made aware of the ability to search for the still images when installing the capture device 102 and/or configuring the user account 167. Advantageously, even without the cloud storage subscription 117, the user may retrieve the still image(s) 114 by generating the search request 126 defining the search time window 163. For example, when the user suspects an event has occurred within the monitored area 108, the user may use the application 123 running on the client device 122 to generate the search request 126 defining the search time window 153 according to the time (or estimated time) of the event. The application 123 may be linked to the user account 167 of the user and thereby automatically retrieve the still image(s) 114 captured by the corresponding capture device 102. Where the user account 167 is associated with multiple capture devices 102, the search engine 119 may retrieve the still image(s) 114 grouped according to each of the multiple capture devices. In one example, where the user notices that a bicycle is missing from the monitored area 108, rather than reporting the incident to the police, the user may prefer to investigate by retrieving relevant ones of the still image(s) 114, and thereby view evidence of the incident before taking additional action. In the example of FIG. 1A, the user (or other person similarly authorized to manage the capture device 102) may generate the search request 126 to retrieve video images 112 and/or still image(s) 114 captured by the capture device 102 during the search time window 153, and may thereby view evidence of the event 113 within the monitored area 108.

Consent

Where the images 112, 114 are to be viewed by another entity (e.g., a law enforcement entity), the user or owner of the capture device 102 that captured the images must first give permission for the entity to view or otherwise use the images 112, 114. Particularly, the video images 112 and the still image(s) 114 may only be retrieved from the database 118 by the user of the capture device 102, or by the entity when the user provides consent. In certain embodiments, when the entity (e.g., an individual or an enforcement agency such as the police) wishes to view the video images 112 and/or the still image(s) 114, prior to retrieving the images from the database 118, the search engine 119 may first request permission from the user of the capture device 102 that captured the images. For example, the search engine 119 may communicate with the application 123 running on the corresponding client device 122 to request consent for the images 112, 114 to be viewed by any entity other than that user. In certain other embodiments, the search engine 119 may retrieve the images from the database 118, and send the retrieved images to the client device 122 when requesting consent from the user for the entity to view the images. Accordingly, the user may view the images (e.g., on the display 124 of the client device 122) when considering whether to provide consent, and may provide the consent in bulk (e.g., for all images) or on an image-by-image basis.

In certain embodiments, as shown in FIG. 1B, a consent 173 may be given by the user and stored in the corresponding user account 167. For example, when installing the capture device 102 and configuring the user account 167, the user may provide the consent 173 for another entity to use any captured images 112, 114. In certain embodiments, the consent 173 may identify one or more authorized persons (e.g., family members, other users, neighbors, etc.) and/or entities (e.g., enforcement agencies such as the police), thereby providing a blanket consent for these persons and/or entities to retrieve and view the video images 112 and/or still image(s) 114 from the database 118.

Figure 1E:
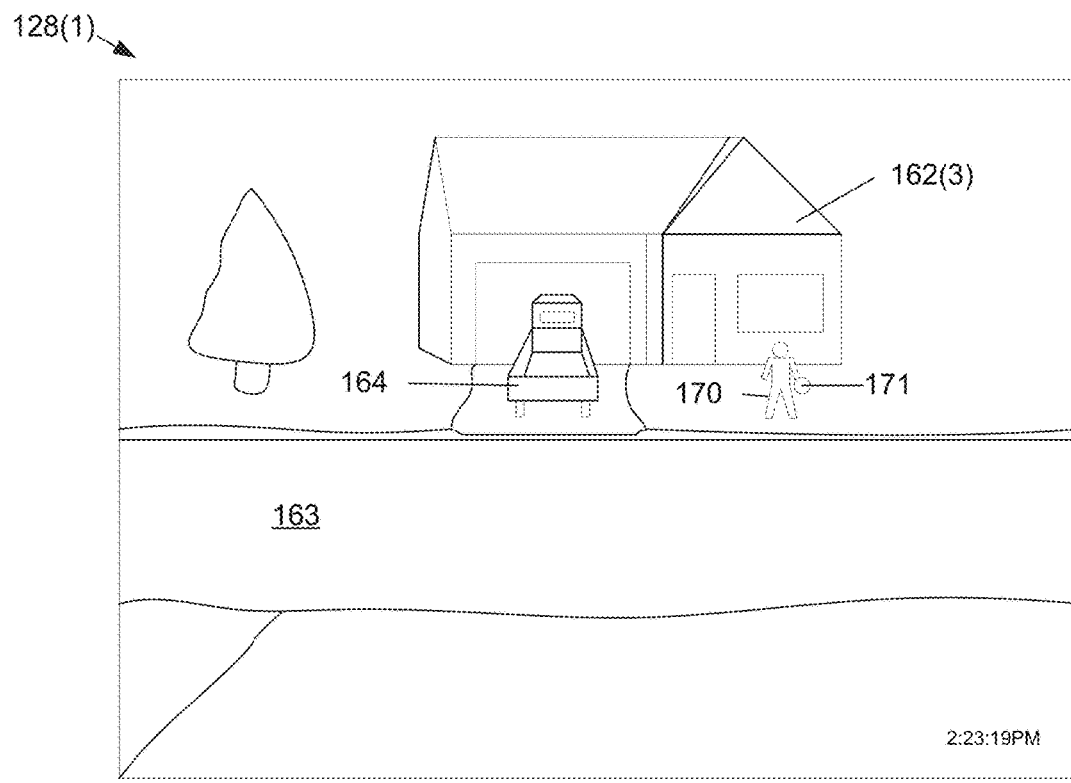
FIGS. 1E and 1F are example images from first and second playable image sequences according to various aspects of the present disclosure.
Figure 1F:
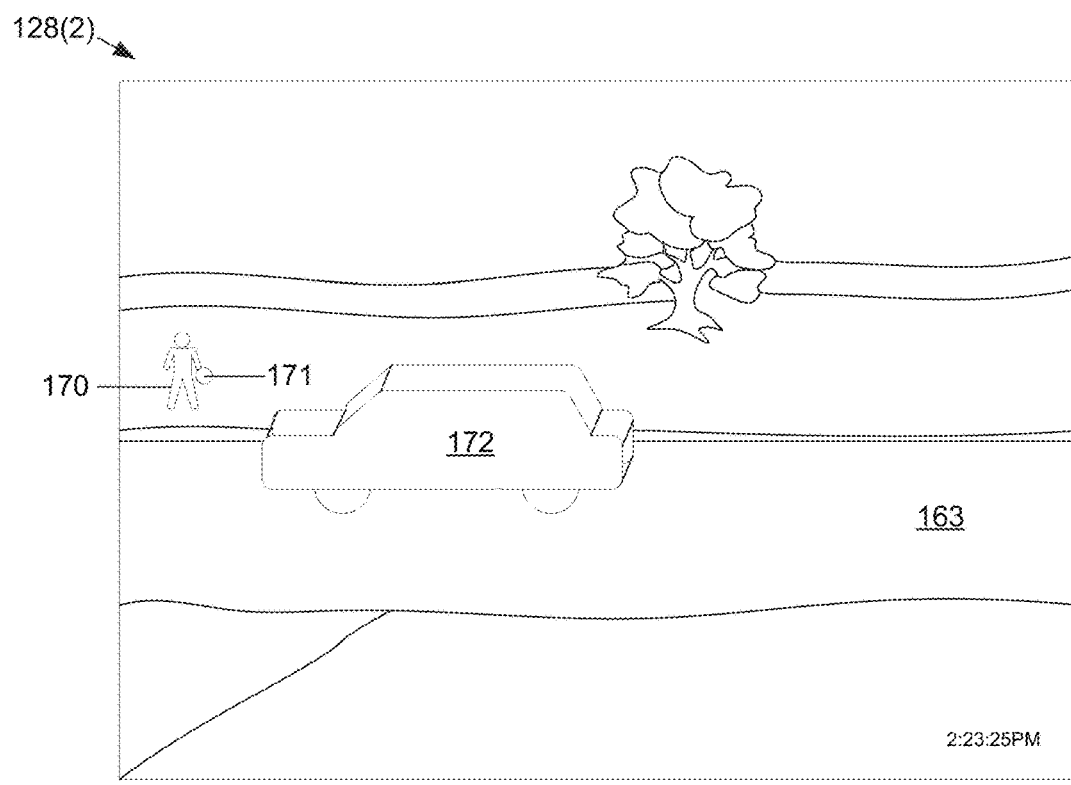

The search engine 119 may then group the retrieved images 127 based upon the capture device IDs 145, and order the retrieved images 127 in each group based upon the capture date and time 146 (e.g., chronologically), to form a first playable image sequence 128(1), shown in FIG. 1E, and a second playable image sequence 128(2), shown in FIG. 1F. In particular, FIG. 1E shows one still image(s) 114 of the first playable image sequence 128(1) captured by the first capture device 102(1) at a time of 2:23:19 PM and showing, in the background of the image, a person 170 carrying an object 171 from the pickup truck 164. FIG. 1F shows one still image(s) 114 of the second playable image sequence 128(2) captured by the second capture device 102(2) at a time of 2:23:25 PM and showing, in the background of the image, the person 170 carrying the object 171 toward a parked vehicle 172. These images may provide valuable evidence of the event 165 that may help the police identify the person 170 carrying the object 171, which may lead to resolution of the event 165 (e.g., arrest and conviction of the person 170 and/or recovery of the object 171).

The security system 100 advantageously makes the retrieval of still image(s) 114 relevant to an event (and video images 112, when captured) very easy using the geographic search area 166 corresponding to the location of the event 165 and the search time window 169 corresponding to the time the event 165 occurred (or an estimate thereof). Since the security system 100, in some embodiments, only stores the still image(s) 114 when the content is significantly different from the reference image 148 (or reference image 157, when implemented within the capture device 102), the number of frames to be viewed by the enforcement person is significantly reduced, as compared to viewing all still frames 114 captured during the search time window 169 for each capture device 102, thereby increasing the likelihood that the evidence of the event 165 will be found quickly. Viewing these still image(s) 114 is further facilitated, since the still image(s) 114 are formatted into the playable image sequence 128, which may be played by the enforcement portal 103 for viewing on the enforcement terminal 101.

Another aspect of the present embodiments includes the realization that, since there is no notification of captured still images (e.g., the still image(s) 114), these still images will remain unviewed unless evidence of a specific event is requested, and unless consent for release of the still images is provided by an authorized person (e.g., the user/owner of the capture device 102 that generated the still image(s) 114).

Figure 1G:
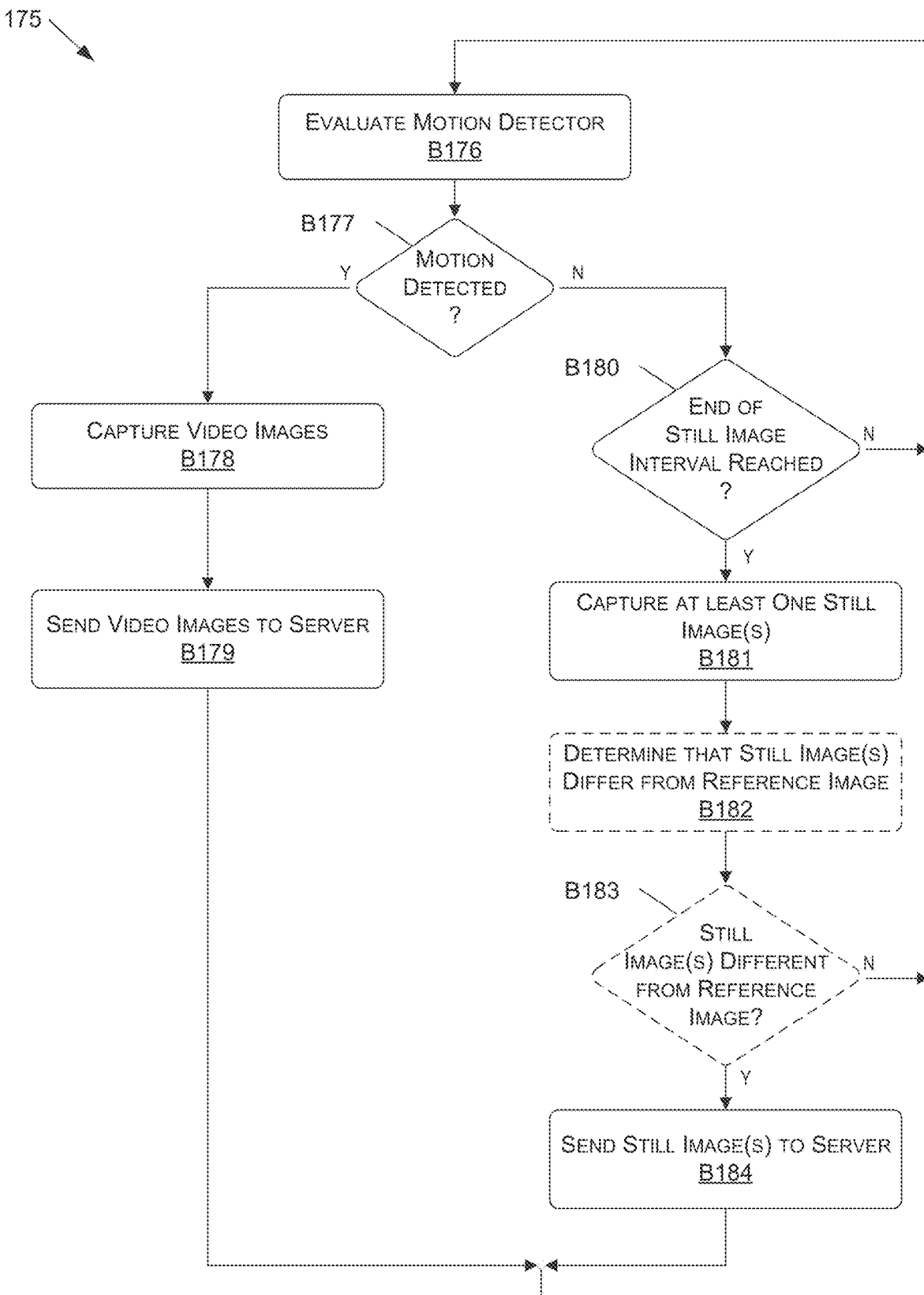
FIGS. 1G, 1H, and 1I are flowcharts illustrating example methods implementing dual-mode event video and still image recording, according to various aspects of the present disclosure.

FIG. 1G is a flowchart illustrating one example method 175 for dual-mode event video and still image recording, according to various aspects of the present disclosure. The method 175 may be implemented, for example, within the device application 156 of the capture device 102 of FIGS. 1A and 1C, to control the camera 104 to capture both video images 112 and still image(s) 114.

In block B176, the motion detector is evaluated. In one example of block B176, the device application 156 uses one or both of the motion detector 106 and/or the camera 104 to detect motion within the motion detection region 109 of the monitored area 108. Block B177 is a decision. If, in block B177, motion is detected, the method 175 continues with block B178; otherwise the method 175 continues with block B180.

In block B178, video images are captured. In one example of block B178, the device application 156 controls the camera 104 to capture the video images 112. In block B179, the video images are sent to the server. In one example of block B179, the device application 156 sends the video images 112 to the server 116 via the network 120 using a video streaming protocol, such as Dynamic Adaptive Streaming over HTTP (DASH, also known as MPEG-DASH), or HTTP Live Streaming (HLS). The method 175 then returns to block B176.

Block B180 is a decision. If, in block B180 it is determined that the end of the still image interval has been reached, then the method proceeds with block B181; otherwise the method 175 returns to block B176. In one example of block B180, the still image manager 110 determines whether the interval between the most recent capture of the still image(s) 114 and the next capture of the still image(s) has been reached. This determination may be based on, for example, expiration of an interval timer, which may be implemented in the still image manager 110. In block B181, at least one still image(s) is captured. In one example of block B181, the still image manager 110 controls the camera 104 to capture at least one still image(s) 114. Blocks B182 and B183 may be included in certain embodiments (and not necessarily in all embodiments) and are accordingly shown in dashed outline. In block B182, when included, whether the still image(s) differs from the reference image is determined. In one example of block B182, the comparator 158 compares the still image(s) 114 to the reference image 157 to determine whether there are significant differences. Block B183 is a decision. If, in Block B183, when included, the still image(s) is significantly different from the reference image, the method 175 proceeds with block B184; otherwise, the method 175 returns to block B176. In block B184, the still image(s) are sent to the server. In one example of block B184, the still image manager 110 sends the still image(s) 114 to the server 116 via the network 120. The method 175 then continues with block B176.

In various embodiments, blocks B176 through B184 of the method 175 may repeat to capture video images when motion is detected, to capture still images, at intervals, when no motion is detected, and to send the captured video and/or sill images to the server.

Figure 1H:
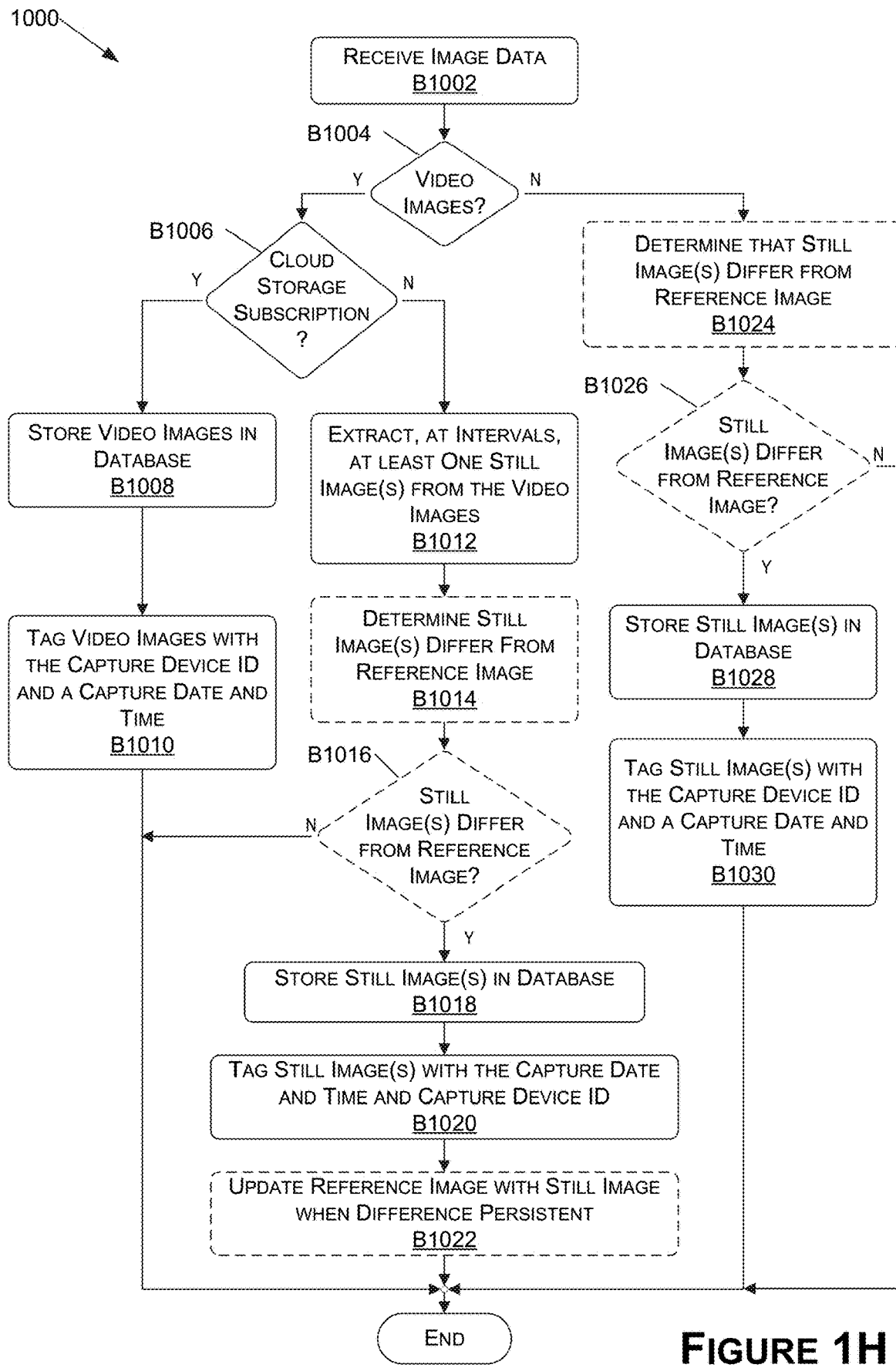

FIG. 1H is a flowchart illustrating another example method 1000 for dual-mode event video and still image recording, according to various aspects of the present disclosure. The method 1000 may be implemented in the server application 143 of the server 116, for example. As explained in further detail below, in the method 1000 both the video images 112 and the still image(s) 114 are received from the capture devices 102 of the security system 100. When the video images 112 are received, and the capture device 102 is not associated with a cloud storage subscription, then individual frames are extracted from the video images 112 and stored as the still image(s) 114 in the database 118. This aspect of the method 1000 may be implemented when an event occurs at the capture device 102 that causes live video to be sent, via the server 116, to a client device associated with the capture device 102, such as when the capture device 102 is a video doorbell and a visitor presses the button of the video doorbell.

With reference to FIG. 1H, in block B1002 image data is received. In one example of block B1002, the image handler 144 receives the video images 112 and/or the still image(s) 114 from the capture device 102. Block B1004 is a decision. If, in block B1004, the received image data is video, the method 1000 continues with block B1006; otherwise, the method 1000 continues with block B1024.

Block B1006 is a decision. If, in block B1006, the capture device has a cloud storage subscription, the method 1000 continues with block B1008; otherwise, the method 1000 continues with block B1012. In block B1008, the video images are stored in the database. In one example of block B1008, the image handler 144 stores the video images 112 in the database 118. In block B1010, the video images are tagged with the capture device ID and a capture date and time. In one example of block B1010, the image handler 144 tags the video images 112 with the capture device ID 145 and the capture date and time 146 determined from metadata of the video images 112 received from the capture device 102, where the capture device 102 generates the metadata as the video images 112 are captured. In another example of block B1010, the image handler 144 determines the capture date and time 146 based upon a time of receipt of the video images 112. The tags (e.g., the capture device ID 145 and the capture date and time 146) facilitate searching for the video images 112 within the database 118. In certain embodiments, where the metadata of the video images 112 is searchable within the database 118, block B1010 may be omitted. After block B1010, the method 1000 terminates until further image data is received.

Returning to block B1006, if it is determined that the capture device does not have a cloud storage subscription, then the method 1000 continues with block B1012. In block B1012, at least one still image is extracted, at intervals, from the video images. In one example of block B1012, the image handler 144 invokes the image extractor 152 to extract at least one still image(s) 114 from the video images 112 at defined intervals.

Blocks B1014, B1016, and B1022 may be included in certain embodiments (and not necessarily in all embodiments) and are accordingly shown in dashed outline. In block B1014, when included, whether the still image(s) differ from the reference image is determined. In one example of block B1014, the comparator 149 compares the still image(s) 114 to the reference image 148. Block B1016 is a decision. If, in Block B1016, when included, the still image(s) is significantly different from the reference image, the method 1000 proceeds with block B1018; otherwise, the method 1000 terminates until further image data is received.

In block B1018, the still image(s) are stored in the database. In one example of block B1018, the image handler 144 stores the still image(s) 114, extracted in block B1012, in the database 118. In block B1020, the still image(s) are tagged with the capture device ID and a capture date and time. In one example of block B1020, the image handler 144 tags the still image(s) 114 with the capture device ID 145 and the capture date and time 146 determined from metadata of the still image(s) 114 received from the capture device 102, where the capture device 102 generates the metadata as the still image(s) 114 are captured. In another example of block B1020, the image handler 144 determines the capture date and time 146 based upon a time of receipt of the still image(s) 114. These tags (e.g., the capture device ID 145 and the capture date and time 146) facilitate searching for the still image(s) 114 within the database 118. In certain embodiments, where the metadata of the still image(s) 114 is searchable within the database 118, block B1020 may be omitted. In block B1022, the reference image is replaced with the still image when the difference is persistent. In one example of block B1022, the reference image manager 150 uses the still image(s) 114 to generate the reference image 148 when the difference between the still image(s) 114 and the reference image 148 has been persistent for a reference image update interval (e.g., five minutes, ten minutes, thirty minutes, etc.). The method 1000 then terminates until further image data is received.

Returning to block B1004, if it is determined that the received image data is not video, then the method 1000 continues with blocks B1024 and B1026 (if blocks B1024 and B1026 are included; otherwise the method 1000 continues with block B1028). Blocks B1024 and B1026 may be included in certain embodiments (not necessarily all embodiments) and are accordingly shown in dashed outline. In block B1024, when included, the still image(s) is compared to the reference image. In one example of block B1024, the comparator 149 compares the still image(s) 114 to the reference image 148. Block B1026 is a decision. If, in Block B1026, when included, the still image(s) is significantly different from the reference image, the method 1000 proceeds with block B1028; otherwise the method 1000 terminates until further image data is received. In block B1028, the still image(s) are stored in the database. In one example of block B1028, the image handler 144 stores the still image(s) 114, received in block B1002, in the database 118. In block B1030, the still image(s) are tagged with the capture device ID and a capture date and time. In one example of block B1030, the image handler 144 tags the still image(s) 114 with the capture device ID 145 and the capture date and time 146 determined from metadata of the still image(s) 114 received from the capture device 102, where the capture device 102 generates the metadata as the still image(s) 114 are captured. In another example of block B1030, the image handler 144 determines the capture date and time 146 based upon a time of receipt of the still image(s) 114. The tags (e.g., the capture device ID 145 and the capture date and time 146) facilitate searching for the still image(s) 114 within the database 118. In certain embodiments, where the metadata of the still image(s) 114 is searchable within the database 118, block B1030 may be omitted. The method 1000 then terminates until further image data is received.

Figure 1I:
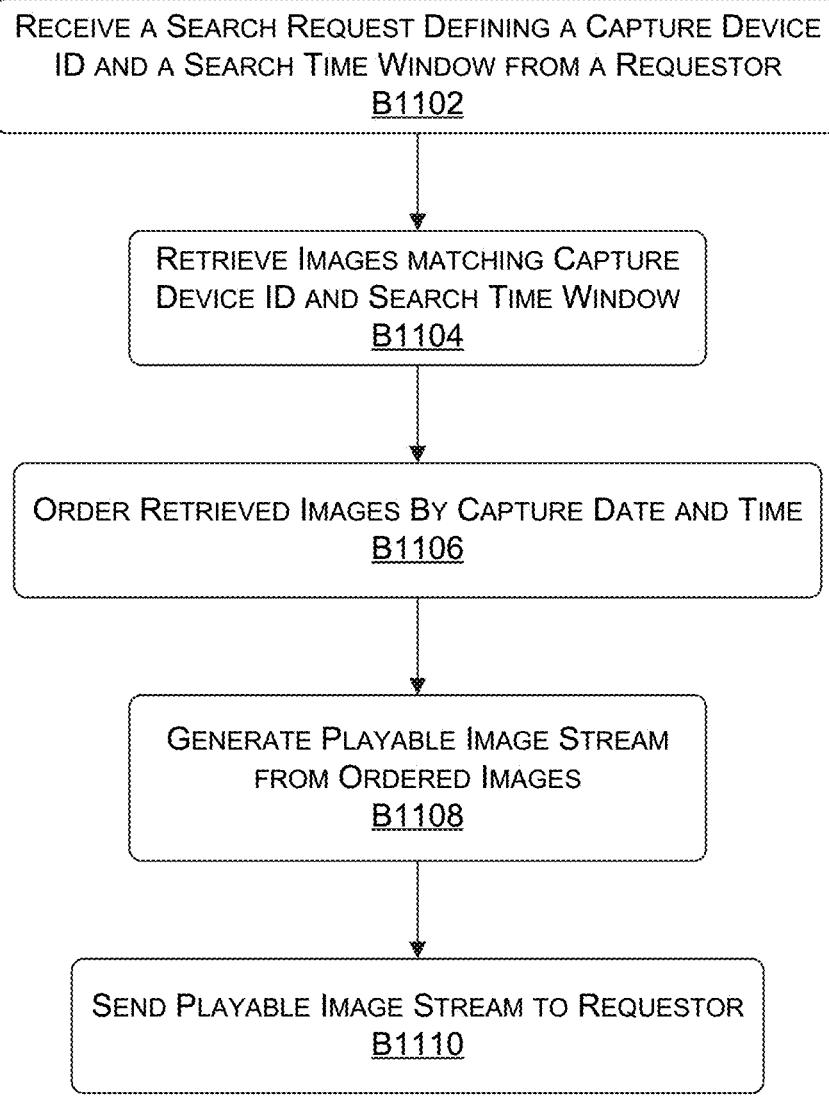

FIG. 1I is a flowchart illustrating one example method 1100 for retrieving dual-mode event video and still images recorded by the capture device 102, according to various aspects of the present disclosure. The method 1100 may be implemented in the server application 143 of the server 116, for example. Particularly, the method 1100 is invoked when the search request 126 is received by the search engine 119 from the client device 122 (FIG. 1A, e.g., from the user/owner of the capture device 102).

In block B1102, a search request defining a capture device ID and a search time window is received from a requestor. In one example of block B1102, the search engine 119 receives the search request 126 defining the capture device ID 145 and the search time window 153 from the client device 122. As described above, the user may identify in the search request 126 one or more of his or her capture devices 102 that should be searched. The search request 126 may identify the capture devices 102 by name (e.g., "Front Doorbell," "North Alley Security Cam," etc.), or the search request 126 may include all devices corresponding to the requesting user/owner. Either way, the application 123 and/or the server 116 may associate the device name(s) with their respective capture device IDs 145.

In block B1104, images matching the capture device ID and the search time window are retrieved from the database. In one example of block B1104, the search engine 119 retrieves, from the database 118, still image(s) 114 having tags matching the capture device ID 145 of the search request 126 and having a capture date and time 146 that is within the search time window 153 of the search request 126. In block B1106, the retrieved still images are ordered by capture date and time. In one example of block B1106, the search engine 119 orders the retrieved images 127 based upon the capture date and time 146 of each image. In block B1108, a playable image sequence is generated from the ordered images. In one example of block B1108, the sequence generator 129 processes the ordered images to generate the playable image sequence 128. In block B1110, the playable image sequence is sent to the requestor. In one example of block B1110, the search engine 119 sends the playable image sequence 128 to the client device 122. The method 1100 then terminates until a next search request 126 is received.

Figure 1J:
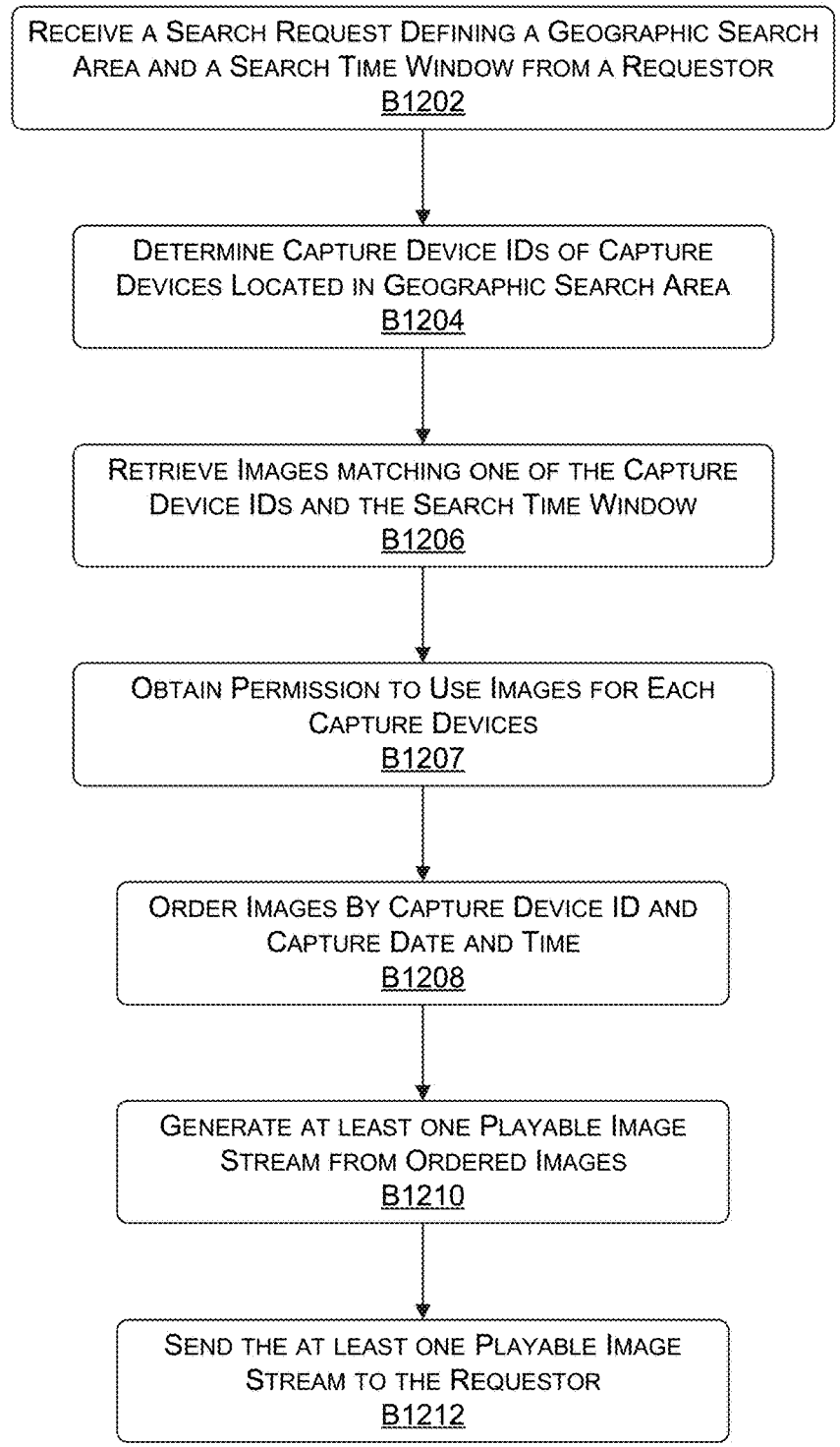
FIG. 1J is a flowchart illustrating one example method for retrieving recorded event video and still images from multiple capture devices in a geographic search area, according to various aspects of the present disclosure.

FIG. 1J is a flowchart illustrating one example method 1200 for retrieving dual-mode event video and still images recorded by multiple capture devices in a geographic search area, according to various aspects of the present disclosure. The method 1200 may be implemented in the server application 143 of the server 116, for example. Particularly, the method 1200 is invoked when the enforcement search request 125 is received by the search engine 119 from the enforcement terminal 101 (FIG. 1A, e.g., from a police department).

In block B1202, a search request defining a geographic search area and a search time window is received from a requestor. In one example of block B1202, the search engine 119 receives the enforcement search request 125 defining the geographic search area 166 and the search time window 169 from the enforcement terminal 101. In block B1204, capture device IDs of capture devices located within the geographic search area are determined. In one example of block B1204, the search engine 119 processes each user account 167 within the database 118, so long as authorized, to determine capture device IDs 145 of capture devices 102 with the device location 168 within the geographic search area 166.

In block B1206, images tagged with a capture device ID matching any of the capture device IDs determined in block B1204, and having a capture date and time within the search time window, are retrieved from the database. In one example of block B1206, the search engine 119 retrieves, from the database 118, video images 112 and/or still image(s) 114 that were tagged with any one of the capture device IDs 145 determined in block B1204, and tagged with a capture date and time 146 that falls within the search time window 169 of the enforcement search request 125. In block B1207, permission to use the still images is obtained for each of the capture devices identified in block B1204. In one example of block B1207, the search engine 119 determines whether the user accounts 167 corresponding to the capture device IDs 145 determined in block B1204 include the consent 173 that allows the requestor to view the still image(s) 114 retrieved from the database. For the user accounts 167 that do not include the consent 173, the search engine may interact with the user, via the client device 122 for example, to request permission for the retrieved still image(s) 114 to be shared with the requestor.

In block B1208, the retrieved images are grouped by capture device ID, and the still image(s) 114 in each group, if any, are ordered by capture date and time. In one example of block B1208, the search engine 119 groups the retrieved images 127 that may be shared with the requestor based upon the capture device IDs 145 of the retrieved images 127, and orders the still image(s) 114 in each group, if any, by the capture date and time 146 of the retrieved images 127. In block B1210, at least one playable image sequence is generated from the ordered still images. In one example of block B1210, for each different capture device ID 145, the sequence generator 129 processes the corresponding ordered images to generate the playable image sequence 128, such that one playable image sequence 128 is generated for each capture device ID 145 of the retrieved images 127. In another example of block B1210, the sequence generator 129 processes the ordered images to generate one playable image sequence 128 that includes all the retrieved images 127. In block B1212, the playable image sequence is sent to the requestor. In one example of block B1212, the search engine 119 sends each of the at least one playable image sequence(s) 128 to the enforcement terminal 101. The method 1200 then terminates until a next enforcement search request 125 is received.

Figure 2:
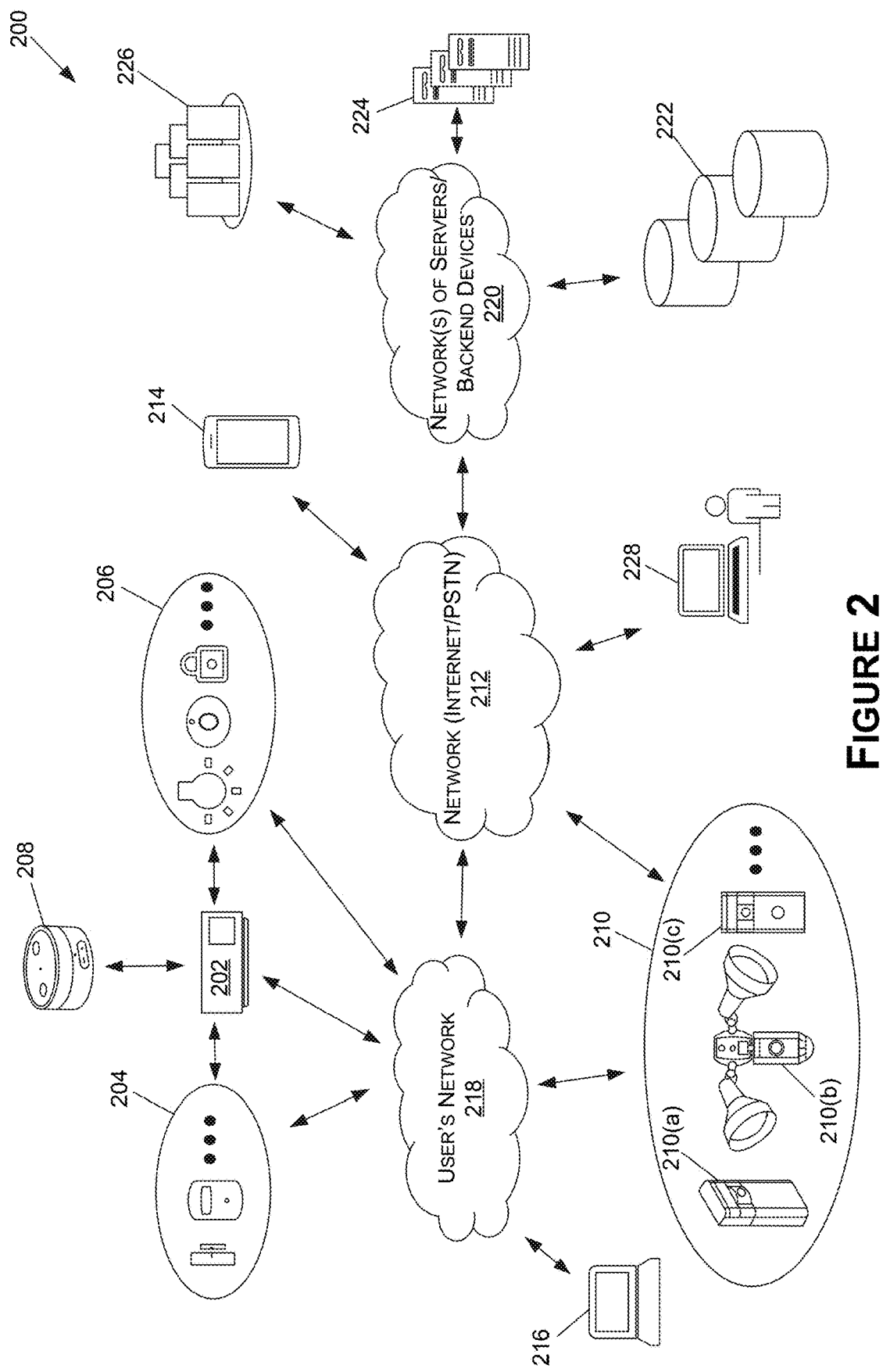
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 120 of FIG. 1A), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may incorporate functionality of the capture device 102 of FIGS. 1A, 1C and 1D, for example). The A/V devices 210 may include security cameras 210(*a*), light cameras 210(*b*) (e.g., floodlight cameras, spotlight cameras, etc.), video doorbells 210(*c*) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 122 of FIG. 1A). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or devices 220, such as (but not limited to) one or more remote storage devices 222 (may be referred to interchangeably as "cloud storage device(s)"), one or more servers 224, and one or more application programming interfaces (APIs) 226. While FIG. 2 illustrates the storage device 222, the server 224, and the API 226 as components separate from the network 220, it is to be understood that the storage device 222, the server 224, and/or the API 226 may be considered to be components of the network 220. For example, the network 220 may include a data center with a plurality of computing resources used to implement the storage device 222, the server 224, and the API 226.

The server 224 may comprise a computer program or other computer executable code that, when executed by processor(s) of the server 224, causes the server 224 to wait for requests from other computer systems or software (clients) and provide responses. In an embodiment, the server 224 shares data and/or hardware and/or software resources among the client devices 214, 216. This architecture is called the client-server model. The client devices 214, 216 may run on the same computer or may connect to the server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The API 226 may comprise, for example, a server (e.g. a real server, or a virtual machine, or a machine running in a cloud infrastructure as a service), or multiple servers networked together, exposing at least one API to clients. In various embodiments, the API 226 is provided by servers including various components such as an application server (e.g. software servers), a caching layer, a database layer, or other components suitable for implementing one or more APIs. The API 226 may, for example, comprise a plurality of applications, each of which communicate with one another using one or more public APIs. In some embodiments, the API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/devices 220 (e.g., the server 224, the API 226, the storage devices 222, etc.) may be referred to herein as a "network device" or "network devices." The server 116 of FIGS. 1A and 1B may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/devices for monitoring and/or controlling security systems. In such an example, the A/V devices 210, the hub device 202, the VA device 208, the sensors 204, and/or the automation devices 206 may communicate with the client devices and/or one or more components of the network of servers/devices of the security monitoring service 228 over the network (Internet/PSTN) 212 (in some embodiments, via one or more of the components of the network of servers/devices 220).

The capture device 102 of FIGS. 1A and 1C may include similar components and functionality as the A/V device 210. The network 120 may include similar components and functionality as the network 212 (and/or 218 and/or 220), the client device 122 of FIG. 1 may include similar components and functionality as the client devices 214 and 216. The server 116 may include similar components and functionality as one or more of the components of the network of network devices 220, 222, 224, and 226.

Figure 3:
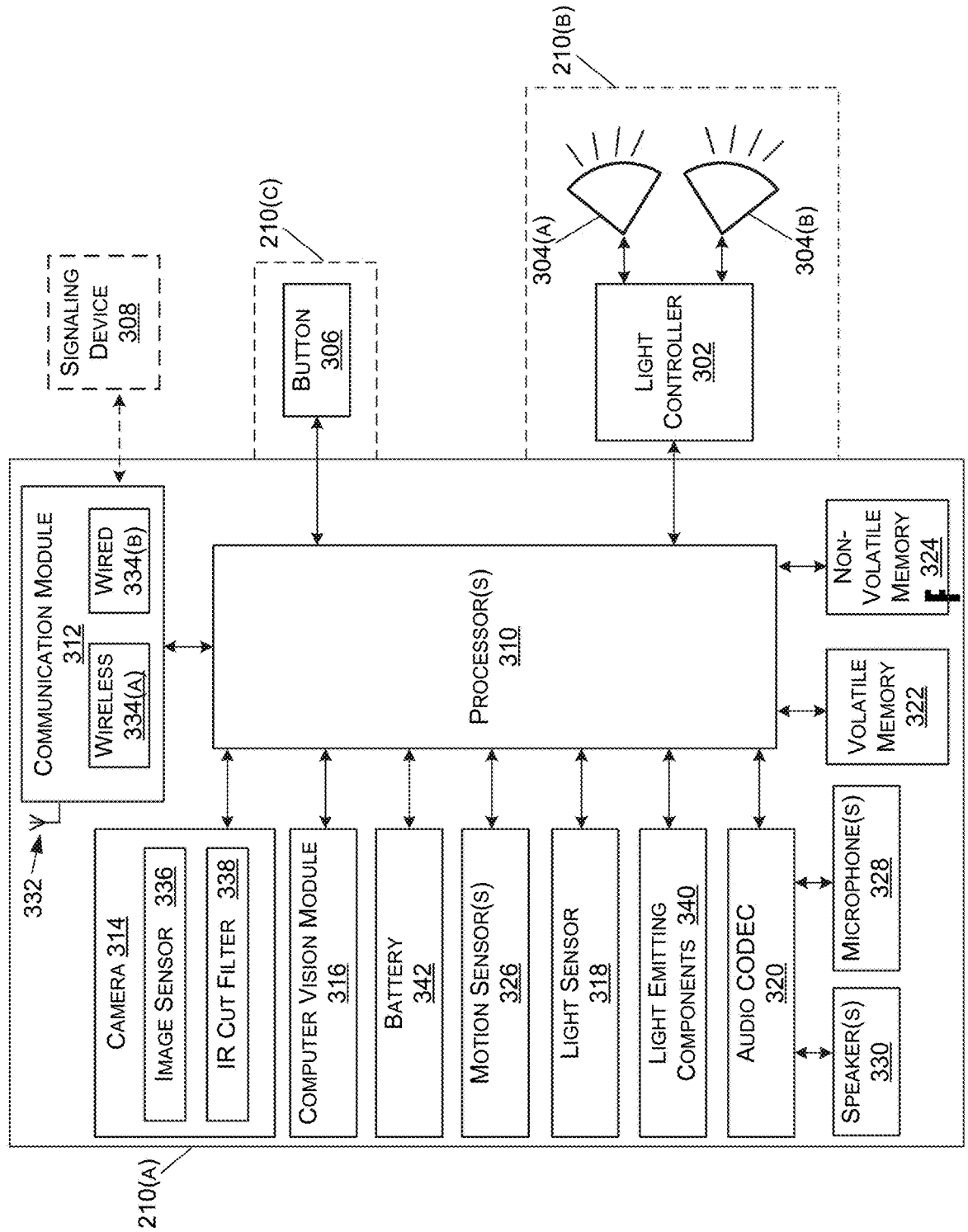
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG.

3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the server 224 and/or the API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
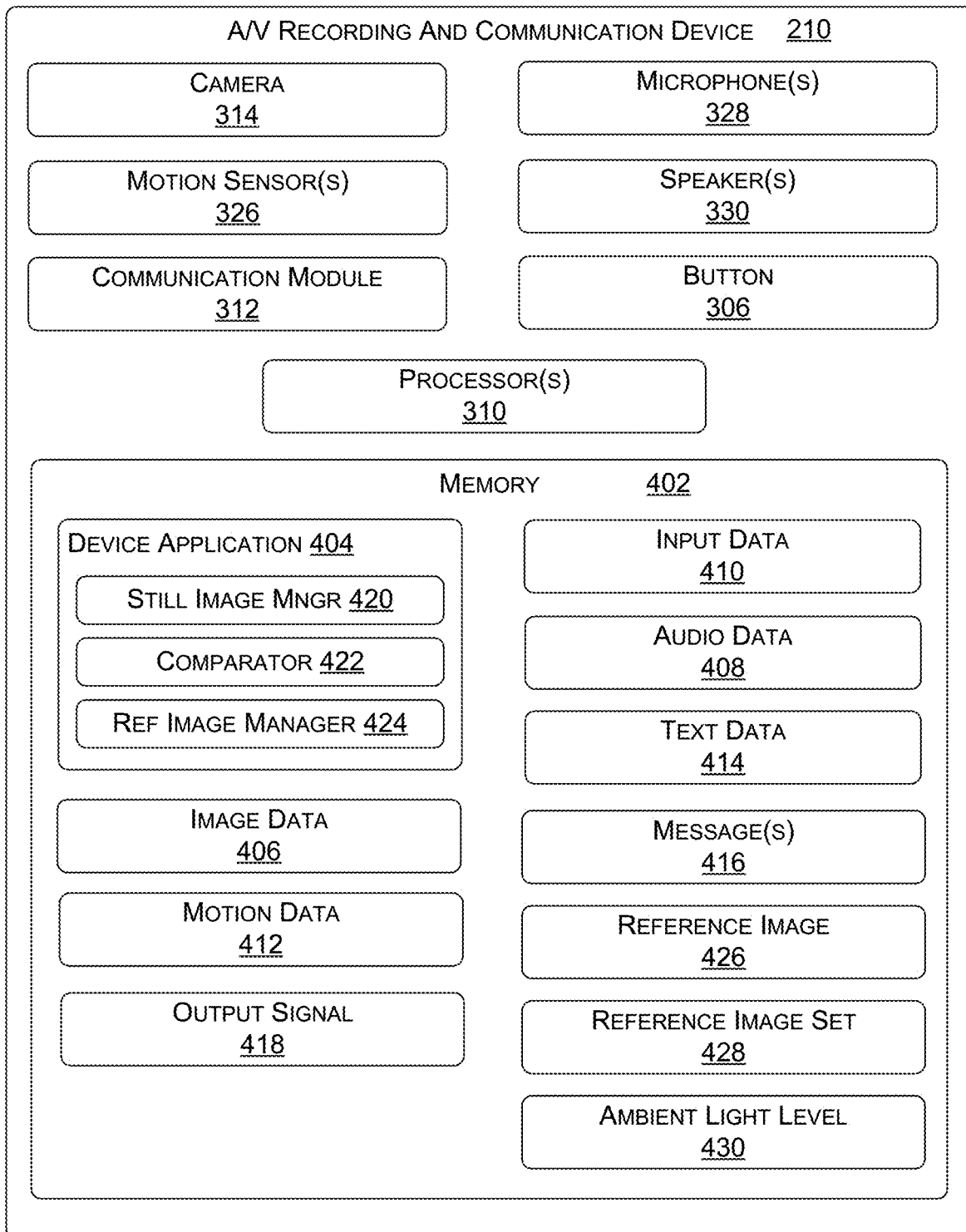
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the server 224 and/or the hub device 202 using the communication module 312. The server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the server 224, and the server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/devices 220) may transmit and receive with other electronic devices (e.g., the A/V device 210, the client device 214, 216, the hub device 202, and/or one or more components of the network(s) of servers/devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously, periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the server 224, the hub device 202, and/or the client device 214, 216 may be executed by the A/V device 210.

The A/V device 210 may include, within the device application 404, a still image manager 420, a comparator 422, and a reference image manager 424 that may include functionality that is similar to the still image manager 110, the comparator 158, and the reference image manager 159 of the capture device 102 of FIGS. 1A and 1C. The memory 402 may also store a reference image 426 that is similar to the reference image 157, a reference image set 428 that is similar to the reference image set 160, and an ambient light level 430 that is similar to the ambient light level 161.

Figure 5:
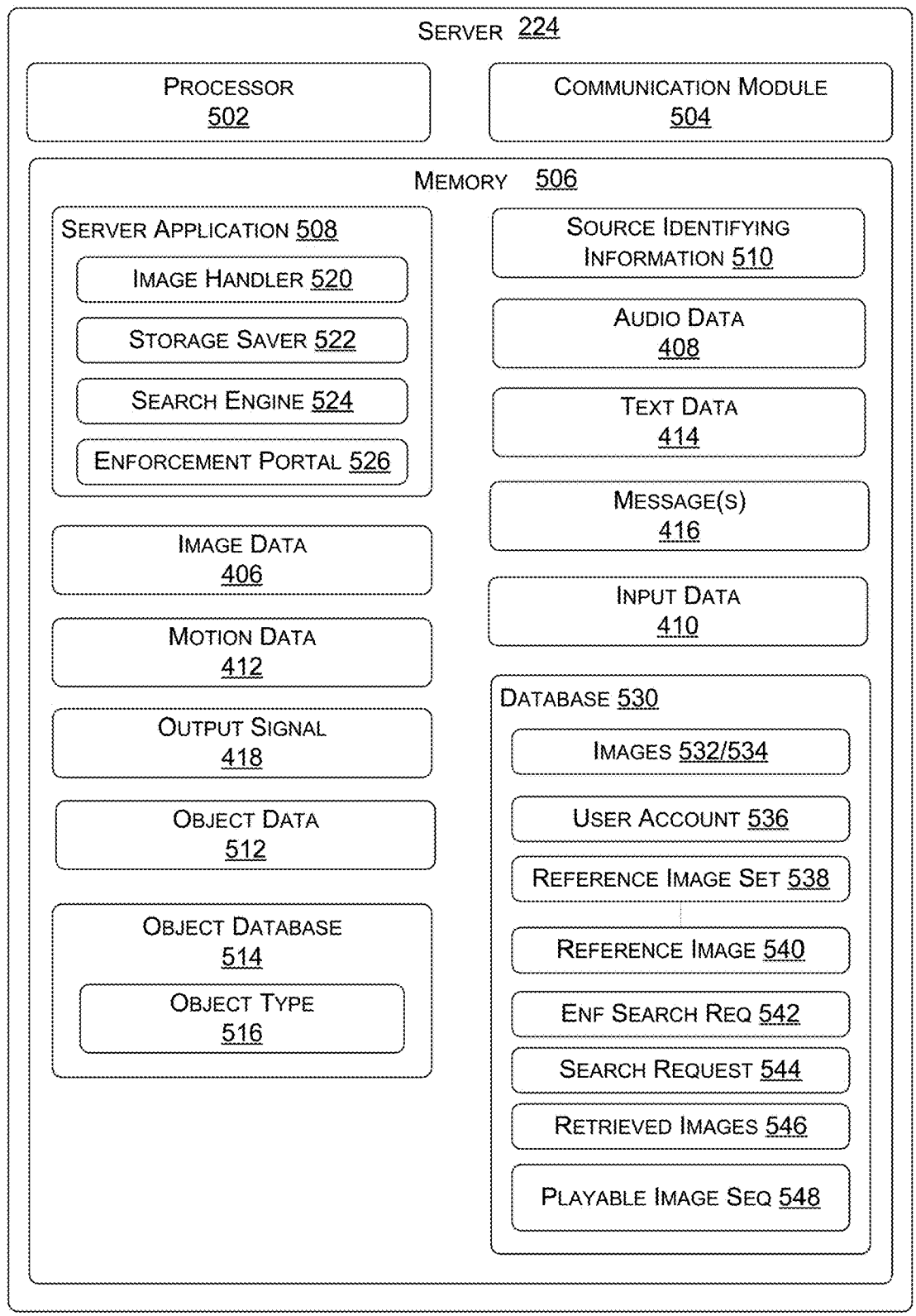
FIG. 5 is a functional block diagram illustrating one example embodiment of a server according to various aspects of the present disclosure.

FIG. 5 is a functional block diagram illustrating one embodiment of the server 224 according to various aspects of the present disclosure. The server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 210.

Although referred to as the server 224 with reference to the processes described herein, the server 224 may additionally, or alternatively, include one or more of the devices from the network(s) of servers/devices 220. For example, the processes described herein with respect to the server 224 may additionally, or alternatively, at least in part, be performed by one or more APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the server 224.

The server 224 may also include, within the server application 508 for example, an image handler 520, a storage saver 522, a search engine 524, and an enforcement portal 526 that have similar functionality to the image handler 144, the storage saver 147, the search engine 119, and the enforcement portal 103 of FIGS. 1A and 1B. The memory 506 may also store a database 530 that is similar to the database 118, for storing video images 532 that are similar to the video images 112, still images 534 that are similar to the still image(s) 114, user accounts 536 that are similar to the user accounts 167, a reference image set 538 that is similar to the reference image set 151, a reference image 540 that is similar to the reference image 148, an enforcement search request 542 that is similar to the enforcement search request 125, a search request 544 that is similar to the search request 126, retrieved images 546 that are similar to the retrieved images 127, and a playable image sequence 548 that is similar to the playable image sequence 128.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the server 224 may analyze the image data 406 whenever the server 224 receives the image data 406 from the A/V device 210.

In some examples, to analyze the image data 406, computer vision processing and/or image processing, as described herein, for example, may be performed by the processor(s) 502 of the server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the server 224 may match the object data 512 from the image data 406 to the image data stored in the object database 514. The processor(s) 502 of the server 224 may then use the match to determine that the object data 512 represents an object and/or to determine the type of object 516 that the object data 512 represents. For example, if the processor(s) 502 of the server 224 matches the object data 512 from the image data 406 to image data stored in the object database 514 that represents a person, then the processor(s) 502 of the server 224 may determine that the image data 406 depicts an object and/or that the image data 406 depicts a person. In some examples, when the object data 512 represents multiple objects, the processor(s) 502 of the server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the server 224, in some embodiments, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the server 224 (and/or one or more additional or alternative components of the network(s) of servers/devices 220) may alternatively be referred to herein as "network devices."

Figure 6:
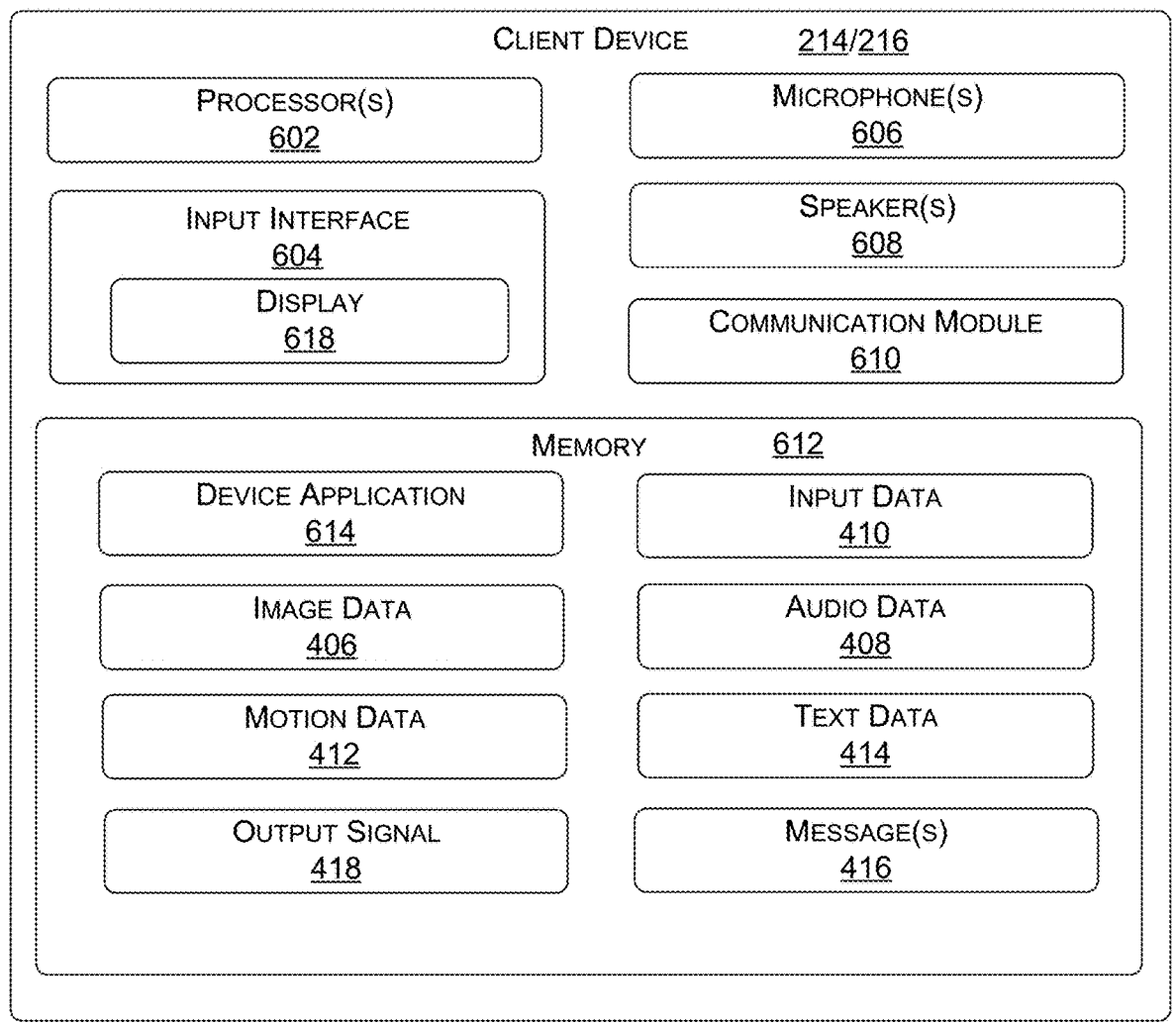
FIG. 6 is a functional block diagram illustrating one example embodiment of a client device according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., the search request 126 of FIG. 1A). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the server 224.

With further reference to FIG. 6, the input interface 604 may include a display 618. The display 618 may include a touchscreen, such that the user of the client device 214, 216 may provide inputs directly to the display 618 (e.g., the search request 126). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the server 224 may be executed by the client device 214, 216.

Figure 7:
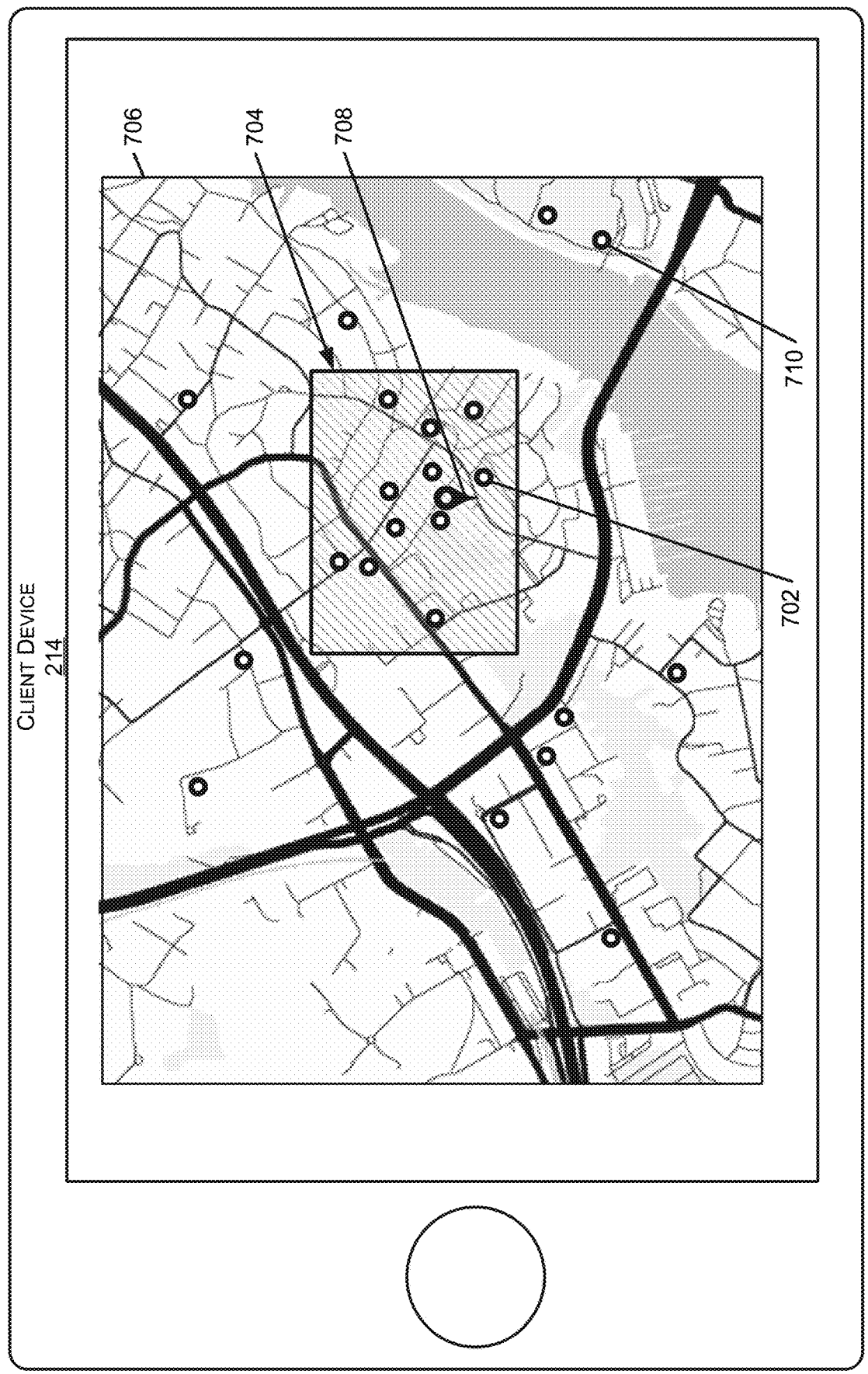
FIG. 7 illustrates an example of a geographic network, according to various aspects of the present disclosure.

FIG. 7 illustrates an example of a geographic network of users, according to various aspects of the present disclosure. In some examples, a geographic network may be executed by a geographic network platform, such as a geographic network platform operating on the server 224 and/or one or more other or additional components of the network of servers/devices 220. As such, the server 224 and/or one or more other or additional components of the network of servers/devices 220 may store and/or maintain the components, features, and/or functionality of the geographic network platform. In some examples, and without limitation, the geographic network may be a neighborhood-oriented or local-oriented network, such as Neighborhoods® or Nextdoor®. In other examples, and without limitation, the geographic network may be a social media network (or a feature within a social media network), such as Facebook®, Twitter®, or Instagram®.

The geographic network platform may enable users of the geographic network to share content (e.g., image data (e.g., image data 406), audio data (e.g., audio data 408), text data (e.g., text data 414), input data (e.g., input data 410), motion data (e.g., motion data 412), and/or other data from the user's A/V device (e.g., the A/V device 210) and/or the user's client device (e.g., the client device(s) 214, 216)) with other users of the geographic network. The geographic network platform may allow users that are located within geographic area(s) to register with the geographic network to access content shared by other users within the geographic area(s). As such, the content that a particular user may have access to may be based on the user's location (e.g., the location of the user's residence, the location of one or more A/V devices associated with the user, the current location of the user (e.g., based on a location of the user's client device), etc.) and/or the location of the electronic device(s) (e.g., the A/V device 210, the client device(s) 214, 216, etc.) that generated the content. For example, users that are located in a geographic area may share content with other users in the geographic area and/or in a similar geographic area, and/or users may view content shared by other users that are located within his or her geographic area (e.g., a neighborhood, a town, a city, a state, a user-defined area, etc.) and/or in a similar geographic area.

In some examples, a user may register with the geographic network platform if the user has an A/V device and/or has an application (e.g., a mobile application, a web application, etc.) associated with the geographic network installed on and/or running on his or her client device. When registering for the geographic network, the user may register, or be required to register, with respect to a geographic area. In some examples, a user may register with the geographic area of the geographic network if the user's residence is located within the geographic area and/or the user has A/V device(s) located (e.g., installed) within the geographic area. In some examples, a user may be a member to one or more geographic areas of the geographic network.

In some examples, a user may be verified to a geographic area of the geographic network that the user is requesting to join. For example, to determine if the user is actually located within a geographic area, GNSS data of the user's A/V device may be used (e.g., during and/or after installation, provisioning, and/or setup of the A/V device). As another example, to determine if the user is actually located within a geographic area, GNSS data of the user's client device may be compared (e.g., over a period time) to an address input by the user. For example, if the user inputs an address, and the location of the user's client device is within a threshold proximity to the address (e.g., over the period of time, which may be, for example and without limitation, four hours, six hours, twenty-four hours, two days, etc.), the user may be verified to the address, and thus verified to the geographic area of the geographic network. A verified user may have full access to features of the geographic network, and/or full access to content shared by other users of the geographic network in the geographic area that the user is verified for. Non-verified users may have limited access to features and/or content of the geographic network. For example, non-verified users may only be able to view content, but not interact with (e.g., comment on, like, share, etc.) the content, and/or may not be able to share his or her own content. A single user may be a verified user of one geographic area of the geographic network and may be a non-verified user of a second geographic area of the geographic network.

In some examples, a provider of the geographic network platform (e.g., hosted on the server 224) may receive shared content from any user that is associated with the provider and/or the geographic network, but each individual user may only share content with and/or view content shared from other users within a geographic area of the user. As a result, content provided to and/or made available to each user by the geographic network platform may be unique to each user (e.g., based on the unique location of the user's residence and/or the user's A/V devices, etc.), and/or unique to a geographic area (e.g., all users associated with a geographic area of the geographic network).

In one illustration of a geographic network, the geographic network platform may facilitate a content feed to allows a user of the geographic network to post videos, photos, text, and/or other data to alert other members of possible suspicious activity in a geographic area. Additionally, or alternatively, news items, police sourced information, and/or other third-party data may be posted to the content feed of the geographic network (e.g., by the users and/or by the provider of the geographic network (e.g., the host of the geographic network platform)), that are related to crime and/or safety of the geographic area (e.g., restricting news items to those related to the geographic area). Members of the geographic network may rate, like, dislike, comment, download, share an existing post/alert with others, and/or upload a new post/alert to the content feed to provide additional information for other users.

A geographic area of a geographic network may be defined using various methods. For example, a geographic area may be associated with one or more neighborhoods, towns, zip codes, cities, states, or countries. In another example, a geographic area may be determined by the server 224 based on grouping a particular number of A/V devices or client devices about a particular vicinity. In a further example, a user may customize a geographic area (e.g., by drawing the geographic area on a map, by providing a radius from the user's property for which the user would like to view shared content, by positioning a boundary (e.g., using markers to define a polygon) of the geographic area over a map, etc.). In such an example, the user's geographic area may be unique to the user.

For example, and as illustrated in FIG. 7, a portion of the geographic network is shown. With reference to FIG. 7, and during a setup or registration process with the geographic network, the location 708 to be associated with the user of the client device 214 may be determined (e.g., based on an address being input by the user, based on a determination of the location of the client device 214, based on the location of the A/V device(s) 210 associated with the user (in examples where the user 214 has one or more A/V devices 210), etc.). In some examples, the user may then be associated with the geographic area 704 of the geographic network, such as based on the neighborhood, town, city, zip code, state, country, or other area that the user is located. In one example, the geographic area 704 may be the town that the location 708 associated with the user is located. In other examples, the user may define, on the map 706, the geographic area 704 of the geographic network that the user wishes to have access to content, which may include the location 708 associated with the user. To define the geographic area 704, the user may overlay a predefined shape on the map 706 (e.g., a rectangle, as shown, a circle, a triangle, a square, a polygon, etc.), may position any number of vertices to define a polygon on the map 706, may define a radius about the location 708 associated with the user, may draw the geographic area 704 on the map, etc. The geographic network may limit the size of the geographic area 704 for the user. The size may be limited to a maximum distance in any direction from the location 708 (e.g., a radius) associated with the user of less than, for example and without limitation, two miles, five miles, ten miles, fifteen miles, fifty miles, or the like.

Although the geographic area 704 includes the geographic area 704 of the geographic network that the user may desire to view content from, the content shared by the user may be shared with a larger, smaller, and/or different geographic area of the geographic network than the geographic area 704. For example, the geographic area 704 may include the geographic area that the user can view content in, but any users located within the entire portion of the map 706 displayed on the client device 214 may be able to view content shared by the user of the client device 214 (e.g., depending on the geographic areas defined by and/or associated with the other users located within the portion of the map 706). For example, users of the geographic network having associated location(s) 710 outside of the geographic area 704 may be able to view the content shared by the user of the client device 214, but the user of the client device 214 may not be able to view, or may choose not to view (e.g., by defining the geographic area 704 that does not include the locations 710), the content shared by the user(s) associated with the location(s) 710. In other examples, the geographic area 704 that the user of the client device 214 desires to view content from may also be the same geographic area 704 that users can view content shared by the user of the client device 214. For example, where the geographic area 704 is a town, each of the users located within the town may only be able to view and share content with each other user located in the town. As another example, where the geographic area 704 is defined by the user of the client device 214, the user of the client device 214 may only be able to view content by the users who are located within the geographic area 704 and the users within the geographic area 704 may be the only users that can view content shared by the user of the client device 214.

With further reference to FIG. 7, and during use of the geographic network platform by the user of the client device 214, the user may access a GUI on the client device 214 (e.g., within a mobile or web application). The user may desire to view shared content from users of the geographic area 704 of the geographic network. As such, the icons illustrating the locations 702 may be included within the geographic area 702 because data generated by client devices and/or A/V devices of users associated with the locations 702 may be available for viewing. In some examples, the icons may be included because the content has not yet been viewed by the user, because the content was shared within a time period (e.g., within the last day, within the last two days, within the last week, etc.), and/or based on other criteria. The user may select the icons, and in response, the user may receive the content (e.g., the image data, audio data, the text data, etc.) associated with the icons (e.g., from the server 224). Although illustrated as icons on a map, in some examples, the content may additionally, or alternatively, be provided as a list. For example, the list may include text describing the content (e.g., date, time, description, location (e.g., as a selectable icon, that when selected may allow the user to view the location on a map), etc.), and individual listings may be selectable, similar to the icons on the map 706.

Each of the processes described herein, including the methods 175, 1000, 1100, and 1200, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

One aspect of the present embodiments includes the realization that many deployed security devices do not have a cloud storage subscription 117 and that captured video is not stored for later use, and is lost. The present embodiments solve this problem by configuring the security system 100 for dual-mode event video and still image recording. When not triggered to capture event video, the capture device 102 nonetheless captures at least one still image(s) 114 at intervals, and sends the still image(s) to the server 116 for storage. Advantageously, this process of event video and still image recording further enables a user of the capture device 102 to retrieve the still image(s) 114 from the server 116.

Another aspect of the present embodiments includes the realization that even when a security device has a cloud storage subscription 117, the security device only captures video when triggered, such as by detecting motion, receiving a button push, receiving a user request for live video, etc. A further realization of this aspect is that configuring motion detection correctly is difficult, and many security devices are not configured correctly, and thus these security devices do not detect motion correctly. A yet further realization of this aspect is that the motion detection and/or other triggering mechanisms of the security device may fail, resulting in the security device not being triggered and therefore not capturing video images. The present embodiments solve this problem by configuring the security system 100 for event video and still image recording. When not triggered to capture event video, the capture device 102 captures at least one still image(s) 114 at intervals, and sends the still image(s) 114 to the server 116 for storage. Advantageously, this process of event video and still image recording captures still image(s) 114 when no motion is detected, and when the motion detection (e.g., motion detector 106) has failed. This enables a user of the capture device 102 to retrieve the still image(s) 114 from the server 116 for events where the capture device 102 did not detect motion.

Another aspect of the present embodiments includes the realization that many of the still images captured by the security device do not contain events of interest and therefore take up valuable storage space unnecessarily. The present embodiments solve this problem by configuring the security system for event video and still image recording of only images that significantly differ from a reference image of expected content for the monitored area. Advantageously, by storing only still images that significantly differ from the reference image, a significant amount of storage space is saved without losing images that may have content of interest.

In a first aspect, a security system has dual-mode event video and still image recording. The system includes a video doorbell and a server. The video doorbell has a camera with a field of view of a monitored area, a motion detector configured to detect motion within the monitored area, a first processor communicatively coupled with the motion detector and the camera, a first network interface communicatively coupled with the first processor, and a first memory. The first memory includes instructions executed by the first processor to: control the camera to capture images of the monitored area; when the motion is detected by the motion detector, send video images, from the camera, to the server, remote from the video doorbell, via the first network interface; and when the motion is not detected, send, at intervals, at least one still image, from the camera, to the server via the first network interface. The server has a second processor, a second network interface communicatively coupled with the second processor, and a second memory. The second memory includes instructions executed by the second processor to: receive both the video images and the still images from the video doorbell via the second network interface, wherein sequences of the still images use less bandwidth than the video images; determine when the still images significantly differ from a reference image; when the still images significantly differ from the reference image, store, in a database, the still images tagged with an identity of the video doorbell and a capture date and time; determine whether the video doorbell has a cloud storage subscription; when the video doorbell has the cloud storage subscription, store, in the database, the video images tagged with the identity of the video doorbell and a capture date and time; when the video doorbell does not have the cloud storage subscription: process the video images to extract, at intervals, at least one video frame; and store the at least one video frame, tagged with the identity of the video doorbell and a capture date and time, in the database; receive, via the second network interface and from a client device associated by account with the video doorbell, a search request defining a search date and time of an event of interest; determine a search time window based upon the search date and time; retrieve, from the database, still images and video frames with capture dates and times that are within the search time window; order, based upon the capture date and time, the still images and the video frames within the search time window into a playable image sequence; and send the playable image sequence to the client device for display on a screen of the client device.

Certain embodiments of the first aspect further comprise instructions stored in the second memory and executable by the second processor to: compare the video frames and the still images to the reference image, and to previously received video frames, and to previously received still images; determine that one of the video frames or one of the still images differs from the reference image by at least a threshold amount; and store the one of the video frames or the one of the still images as a new reference image.

In a second aspect, an image capture device includes a camera, a processor communicatively coupled with the camera, a communication module communicatively coupled with the processor, and a memory communicatively coupled with the processor. The memory stores machine-readable instructions that, when executed by the processor, control the processor to: capture, using the camera, one or more first still image(s); send, using the communication module, the first still image(s) to a server; after an interval has elapsed after capturing the one or more first still image(s), capture, using the camera, one or more second still image(s); send, using the communication module, the second still image(s) to the server; detect motion in a monitored area of the image capture device; capture, using the camera, video images of the monitored area; and send, using the communication module, the video images to the server.

In certain embodiments of the second aspect, the one or more first still images and the one or more second still images each comprise a burst of still images.

In certain embodiments of the second aspect, each burst of still images comprises between two and five images and has a frame rate of six frames per second or lower.

In certain embodiments of the second aspect, the interval is between one and fifteen seconds.

Certain embodiments of the second aspect further include, for each of the one or more first still images and the one or more second still images, generating a still image data file having a format selected from the group including JPEG (Joint Photographic Experts Group), JFIF (JPEG File Interchange Format), Exif (Exchangeable image file format), TIFF (Tagged Image File Format), GIF (Graphics Interchange Format), and PNG (Portable Network Graphics), wherein the still image data file is sent to the server.

Certain embodiments of the second aspect further include machine readable instructions stored in memory that, when executed by the processor, control the processor to: store images captured by the camera in chronological order in a rolling buffer at a first frame rate, wherein the images include the one or more first still images, the one or more second still images, and the video images; read the one or more first still images corresponding to a second frame rate from the rolling buffer prior to sending the first still images to the server; read the one or more second still images corresponding to the second frame rate from the rolling buffer prior to sending the second still images to the server; and read the video images from the rolling buffer at the first frame rate prior to sending the video images to the server.

Certain embodiments of the second aspect further include machine readable instructions stored in memory that, when executed by the processor, control the processor to compare a most recently stored image in the rolling buffer with an earlier stored image of the rolling buffer, to detect the motion in the monitored area.

Certain embodiments of the second aspect further include a motion detector, separate from the camera. Determining that motion may have been detected in the monitored area comprises the processor receiving a signal from the motion detector indicative of the motion.

Certain embodiments of the second aspect further include machine-readable instructions, stored in the memory, that, when executed by the processor, control the processor to: compare the still images to a reference image of the monitored area; determine that one of the still images significantly differs from the reference image; and send the one of the still images to the server.

Certain embodiments of the second aspect further include machine-readable instructions, stored in the memory, that, when executed by the processor, control the processor to replace the reference image with the one of the still images.

Certain embodiments of the second aspect further include machine-readable instructions, stored in the memory, that, when executed by the processor, control the processor to: detect a current ambient light level at the monitored area; and select, based at least in part upon the current ambient light level, the reference image from a group of reference images, wherein the reference images in the group of reference images represent the monitored area at different ambient light levels, and one of the reference images in the group of reference images that most closely matches the current ambient light level at the monitored area is selected as the reference image.

In a third aspect, a method, includes: receiving video images from an image capture device; determining that the image capture device is not associated with a cloud storage subscription; extracting, at intervals, from the video images, a plurality of extracted images; storing the extracted images in a database; and tagging the extracted images with an identity of the image capture device and a date and time of capture.

Certain embodiments of the third aspect further include: determining that one of the extracted images significantly differs from the reference image; determining that none of the extracted images significantly differ from one another; and updating the reference image based at least in part upon one of the extracted images. The extracted images corresponding to a reference image update interval.

Certain embodiments of the third aspect further include: determining an ambient light level associated with the extracted images; and selecting, based at least in part upon the ambient light level associated with the extracted images, the reference image from a group of reference images.

In certain embodiments of the third aspect, the reference images in the group of reference images represent different ambient light levels, and one of the reference images in the group of reference images that most closely matches the ambient light level associated with the extracted images is selected as the reference image.

Certain embodiments of the third aspect further include: determining that none of the extracted images significantly differs from the reference image; and discarding the extracted images.

In certain embodiments of the third aspect, the determining that none of the extracted images significantly differs from the reference image further comprises: determining first characteristics of objects in the reference image; determining second characteristics of objects in the extracted images; and determining, for each of the extracted images, that the second characteristics match the first characteristics. The first and second characteristics including one or more of a count of objects, object types, and object locations.

In certain embodiments of the third aspect, the determining that none of the extracted images significantly differs from the reference image comprises: determining first perceptual hash of the reference image; determining second perceptual hash of each of the extracted images; and determining that each of the second perceptual hashes is within a threshold value of the first perceptual hash.

Figure 8:
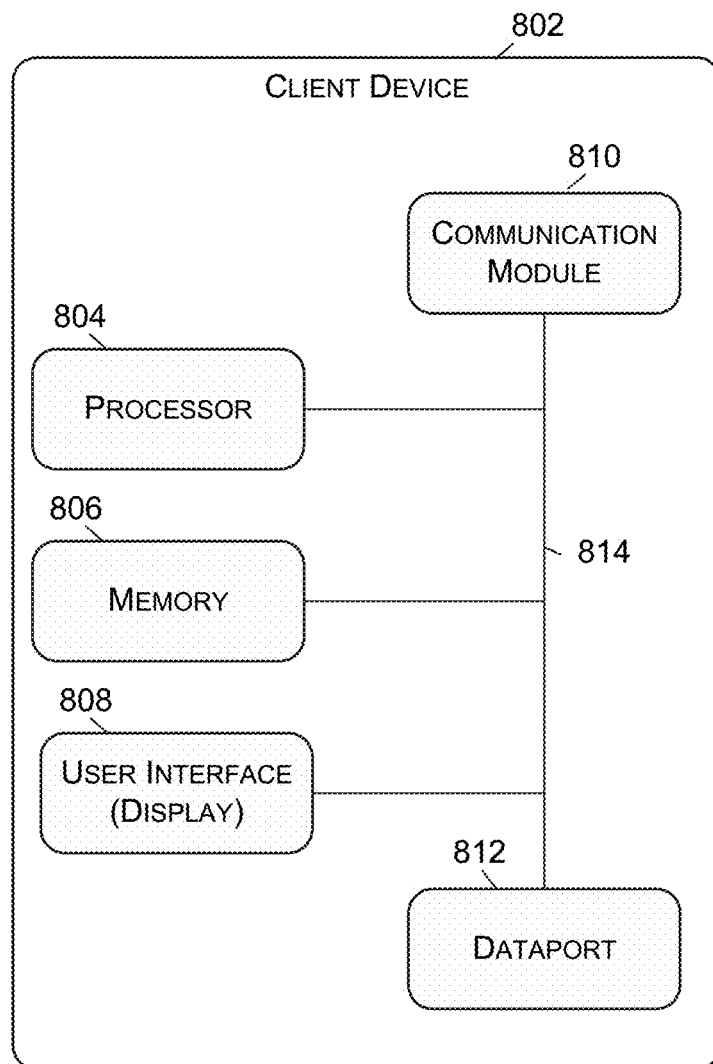
FIG. 8 is a functional block diagram of a client device on which the present embodiments may be implemented according to various aspects of the present disclosure.

FIG. 8 is a functional block diagram of a client device 802 on which the present embodiments may be implemented according to various aspects of the present disclosure. The client device(s) 214, 216 described with reference to FIG. 2 may include some or all of the components and/or functionality of the client device 802. The client device 802 may comprise, for example, a smartphone.

With reference to FIG. 8, the client device 802 includes a processor 804, a memory 806, a user interface 808, a communication module 810, and a dataport 812. These components are communicatively coupled together by an interconnect bus 814. The processor 804 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 806 may include both operating memory, such as random-access memory (RAM), as well as data storage, such as read-only memory (ROM), hard drives, flash memory, or any other suitable memory/storage element. The memory 806 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 804 and the memory 806 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 804 may be connected to the memory 806 via the dataport 812.

The user interface 808 may include any user interface or presentation elements suitable for a smartphone and/or a portable computing device, such as a keypad, a display screen, a touchscreen, a microphone, and a speaker. The communication module 810 is configured to handle communication links between the client device 802 and other, external devices or receivers, and to route incoming/outgoing data appropriately. For example, inbound data from the dataport 812 may be routed through the communication module 810 before being directed to the processor 804, and outbound data from the processor 804 may be routed through the communication module 810 before being directed to the dataport 812. The communication module 810 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 812 may be any type of connector used for physically interfacing with a smartphone and/or a portable computing device, such as a mini-USB port or an IPHONE®/IPOD® 30-pin connector or LIGHTNING® connector. In other embodiments, the dataport 812 may include multiple communication channels for simultaneous communication with, for example, other processors, servers, and/or client terminals.

The memory 806 may store instructions for communicating with other systems, such as a computer. The memory 806 may store, for example, a program (e.g., computer program code) adapted to direct the processor 804 in accordance with the present embodiments. The instructions also may include program elements, such as an operating system. While execution of sequences of instructions in the program causes the processor 804 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 9:
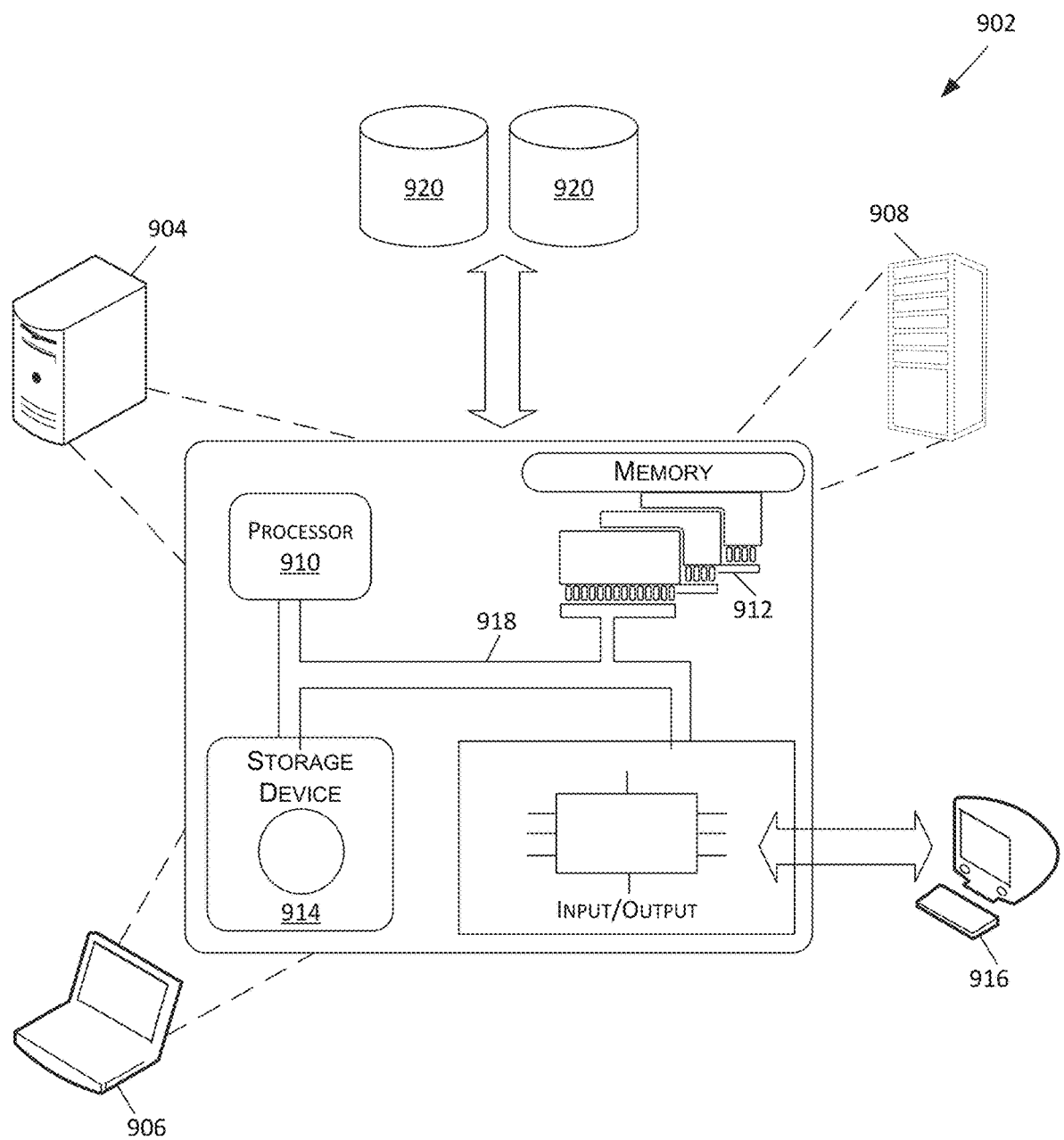
FIG. 9 is a functional block diagram of a general-purpose computing system on which the present embodiments may be implemented according to various aspects of present disclosure.

FIG. 9 is a functional block diagram of a general-purpose computing system on which the present embodiments may be implemented according to various aspects of the present disclosure. The computer system 902 may be embodied in at least one of a personal computer (also referred to as a desktop computer) 904, a portable computer (also referred to as a laptop or notebook computer) 906, and/or a server 908 is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 902 may execute at least some of the operations described above. The computer system 902 may include at least one processor 910, memory 912, at least one storage device 914, and input/output (I/O) devices 916. Some or all of the components 910, 912, 914, 916 may be interconnected via a system bus 918. The processor 910 may be single- or multi-threaded and may have one or more cores. The processor 910 execute instructions, such as those stored in the memory 912 and/or in the storage device 914. Information may be received and output using one or more I/O devices 916.

The memory 912 may store information, and may be a computer-readable medium, such as volatile or non-volatile memory. The storage device(s) 914 may provide storage for the system 902 and, in some embodiments, may be a computer-readable medium. In various aspects, the storage device(s) 914 may be a flash memory device, a hard disk device, an optical disk device, a tape device, or any other type of storage device.

The I/O devices 916 may provide input/output operations for the system 902. The I/O devices 916 may include a keyboard, a pointing device, and/or a microphone. The I/O devices 916 may further include a display unit for displaying graphical user interfaces, a speaker, and/or a printer. External data may be stored in one or more accessible external databases 920.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An image capture device, comprising:
   a camera;
   a processor communicatively coupled with the camera;
   a communication module communicatively coupled with the processor; and
   a memory communicatively coupled with the processor and storing machine-readable instructions that, when executed by the processor, control the processor to:
      capture a reference image of a monitored area;
      when motion is not detected in the monitored area:
         capture, using the camera, a first image and a second image of the monitored area;
         determine there is significant difference between the first image and the reference image;
         based on the significant difference being determined, send, using the communication module, the first image to a server;
         determine the significant difference is present in the second image, wherein a time interval between capture of the first and second images is greater than or equal to a reference image update interval; and based on the significant difference being present in the second image, use the first image or the second image to update the reference image.

2. The image capture device of claim 1, wherein one or both of the first image and the second image comprise a burst of images.

3. The image capture device of claim 2, wherein each burst of images comprises between two and five images captured at a rate of six images per second or less.

4. The image capture device of claim 1, further comprising, for each of the first image and the second image, generating an image data file having a format selected from the group including JPEG (Joint Photographic Experts Group), JFIF (JPEG File Interchange Format), Exif (Exchangeable image file format), TIFF (Tagged Image File Format), GIF (Graphics Interchange Format), and PNG (Portable Network Graphics), wherein the image data file is sent to the server.

5. The image capture device of claim 1, further comprising a motion detector, separate from the camera, for detecting the motion in the monitored area.

6. The image capture device of claim 1, wherein the machine-readable instructions that determine there is significant difference further comprise machine-readable instructions that, when executed by the processor, control the processor to:

determine the significant difference exists when one or more of (a) at least one object detected within the reference image is not detected in the first image, (b) at least one object detected within the first image is not detected in the reference image, and (c) at least one object detected in the reference image is located in a different position as compared to a corresponding object detected in the first image.

7. The image capture device of claim 6, wherein the machine-readable instructions further comprise machine-readable instructions that, when executed by the processor, control the processor to:

detect a current ambient light level at the monitored area; and select, based at least in part upon the current ambient light level, the reference image from a group of reference images, wherein the reference images in the group of reference images represent the monitored area at different ambient light levels, and one of the reference images in the group of reference images that most closely matches the current ambient light level at the monitored area is selected as the reference image.

8. An image capture method, comprising:

triggering an image capture device when motion is detected within a monitored area of the image capture device;

capturing a reference image of the monitored area;

when the image capture device is not triggered:
 capturing, using a camera of the image capture device, a first image and a second image of the monitored area;
 determine significant difference exists between the first image and the reference image when one or more of (a) at least one object detected within the reference image is not detected in the first image, (b) at least one object detected within the first image is not detected in the reference image, and (c) at least one object detected in the reference image is located in a different position as compared to a corresponding object detected in the first image;
 sending the first image to a server when the significant difference exists; and
 using the first image or the second image to update the reference image when the significant difference still exists in the second image, wherein a time interval between capture of the first image and the second image is greater than or equal to a reference image update interval.

9. The method of claim 8, wherein capturing at least one of the first image and the second image comprises capturing a burst of images.

10. The method of claim 9, wherein the burst of images comprises a burst of between two and five images and the third rate is six frames per second or less.

11. The method of claim 8, further comprising generating, for the first image, an image data file having a format selected from the group including JPEG (Joint Photographic Experts Group), JFIF (JPEG File Interchange Format), Exif (Exchangeable image file format), TIFF (Tagged Image File Format), GIF (Graphics Interchange Format), and PNG (Portable Network Graphics), wherein the still image data file is sent to the server.

12. The method of claim 8, further comprising encoding the additional images using one of MPEG (Moving Picture Experts Group, and all its variants), and AVI (Audio Video Interleave), and sending the encoded video images to the server.

13. An image capture method, comprising:

capturing, using a camera of an image capture device, a reference image, a first image, and a second image of a monitored area by the image capture device;

storing the images in a buffer of the image capture device;

when motion is not detected in the monitored area:
 reading the first image from the buffer;
 determining significant difference between the reference image and the first image exists when first objects detected within a reference image differ from second objects detected within the first image;
 sending the first image to a server when the significant difference exists;
 using the first image or the second image to update the reference image when the significant difference still exists in the second image and a time interval between capture of the first image and the second image is greater than or equal to a reference image update interval;

in response to detection of motion in the monitored area:
 capturing video of the monitored area using the camera; and
 sending the video to the server.

14. The method of claim 13, wherein each of the first and second images comprises a burst of between two and five images.

15. The method of claim 14, wherein the bursts of images are captured at an interval of six frames per second or less.

16. The image capture device of claim 1, the machine-readable instructions further comprising machine-readable instructions that, when executed by the processor, further control the processor to:

when there is significant difference store the first image in memory; and when there is no significant difference, discard the first image.

17. The image capture device of claim 1, the reference image being selected from a group of reference images each corresponding to a different weather effect.

18. The image capture device of claim 1, wherein the machine-readable instructions that determine there is significant difference further comprises machine-readable instructions that, when executed by the processor, control the processor to:
  generate a first perceptual hash of the first image; and
  determine significant difference exists when a difference between the first perceptual hash and a second perceptual hash of the reference image is greater than a threshold value.

19. The image capture device of claim 6, wherein the at least one object detected within the reference image or the at least one object detected within the first image is one of a package, a box, an animal, a person, and a vehicle.

20. The image capture device of claim 1, wherein the reference image defines expected imagery of the monitored area and is captured prior to the first image when no motion is detected within the monitored area.

21. The image capture device of claim 1, in response to detection of motion in the monitored area:
  capture, using the camera at a second rate that is faster than a first rate of capture of the first and the second images, additional images of the monitored area; and
  send, using the communication module, the additional images to the server.

22. The method of claim 8, further comprising, when the image capture device is triggered:
  capturing, using the camera and at a second rate faster than a first rate at which the first and the second images were captured, additional images of the monitored area; and
  sending the additional images to the server.

* * * * *